US012789411B2

(12) United States Patent
Mackay Sim

(10) Patent No.: US 12,789,411 B2
(45) Date of Patent: Nov. 10, 2026

(54) RECESS FORMER AND ANCHOR ASSEMBLY

(71) Applicant: LEVIAT PTY LTD, Mount Druitt (AU)

(72) Inventor: Rodney Mackay Sim, New South Wales (AU)

(73) Assignee: LEVIAT PTY LTD, New South Wales (AU)

(*) Notice: Subject to any disclaimer, the term of this patent is extended or adjusted under 35 U.S.C. 154(b) by 403 days.

(21) Appl. No.: 18/567,992

(22) PCT Filed: Jul. 11, 2022

(86) PCT No.: PCT/AU2022/050723
§ 371 (c)(1),
(2) Date: Dec. 7, 2023

(87) PCT Pub. No.: WO2023/283679
PCT Pub. Date: Jan. 19, 2023

(65) Prior Publication Data

US 2024/0217137 A1 Jul. 4, 2024

(30) Foreign Application Priority Data

Jul. 14, 2021 (AU) ................................ 2021902152
Aug. 9, 2021 (AU) ................................ 2021902454
(Continued)

(51) Int. Cl.
*B28B 23/00* (2006.01)
*B28B 21/56* (2006.01)
(Continued)

(52) U.S. Cl.
CPC .......... *B28B 23/0056* (2013.01); *B28B 21/56* (2013.01); *B28B 21/58* (2013.01);
(Continued)

(58) Field of Classification Search
None
See application file for complete search history.

(56) References Cited

U.S. PATENT DOCUMENTS 4,073,114 A 2/1978 Irish
4,087,947 A 5/1978 Turner
(Continued)

FOREIGN PATENT DOCUMENTS

AU 641352 B3 * 9/1993 ............. E04G 15/04
AU 6185994 A * 11/1994 ............. E04G 15/04
(Continued)

OTHER PUBLICATIONS

International Search Report and Written Opinion issued on Aug. 25, 2022 for corresponding PCT Application No. PCT/AU2022/050723.

(Continued)

*Primary Examiner* — Benjamin A Schiffman
(74) *Attorney, Agent, or Firm* — POLSINELLI PC

(57) ABSTRACT

A recess former assembly (200) for creating a recess surrounding a cast in situ lifting element (60) in a cast concrete pipe (1) having a cast outer surface, is disclosed. The assembly has a frame (180) having locating lugs (183) engageable with components (81) of a reinforcing cage (80) to be positioned within the mould (70). The engagement of the lugs with the reinforcing components locates the frame in a rest position spaced from the mould. A removable recess former (150) is releasably retained in the frame. A lifting element (60) is retained within the recess former and has an anchor portion (64) extending therefrom. A non-rigid interconnection (182, 182A, 190, 191) between the lugs and the frame biases the frame and recess former to be urged
(Continued)

towards the mould into an operative casting position in which at least a portion of the recess former substantially abuts the mould.

18 Claims, 15 Drawing Sheets

(30) Foreign Application Priority Data

| | | |
|---|---|---|
| Aug. 15, 2021 | (AU) | 2021902539 |
| Aug. 15, 2021 | (AU) | 2021902540 |
| Sep. 23, 2021 | (AU) | 2021903061 |

(51) Int. Cl.

| | |
|---|---|
| ***B28B 21/58*** | (2006.01) |
| ***B28B 23/22*** | (2006.01) |
| ***B66C 1/66*** | (2006.01) |
| ***E04G 15/04*** | (2006.01) |
| ***E04G 21/14*** | (2006.01) |
| ***F16L 9/08*** | (2006.01) |

(52) U.S. Cl.
CPC ........ *B28B 23/005* (2013.01); *B28B 23/0068* (2013.01); *B28B 23/22* (2013.01); *B66C 1/666* (2013.01); *E04G 15/04* (2013.01); *E04G 21/142* (2013.01); *F16L 9/085* (2013.01)

(56) References Cited

U.S. PATENT DOCUMENTS

| | | | | | |
|---|---|---|---|---|---|
| 4,471,936 | A * | 9/1984 | Bondpers | B28B 7/30 | 249/152 |
| 6,095,483 | A * | 8/2000 | Mackay Sim | E04G 21/142 | 249/91 |
| 8,024,896 | B2 * | 9/2011 | Azarin | B28B 23/005 | 52/125.4 |
| 10,240,356 | B2 * | 3/2019 | Mackay Sim | E04G 21/142 | |
| 2005/0017521 | A1 * | 1/2005 | Lawley | B66C 1/666 | 294/215 |
| 2006/0248811 | A1 * | 11/2006 | Hansort | E04G 15/04 | 52/122.1 |
| 2007/0186492 | A1 | 8/2007 | Bennett et al. | | |
| 2009/0183441 | A1 | 7/2009 | Azarin | | |
| 2009/0320386 | A1 | 12/2009 | Mackay Sim | | |
| 2017/0247232 | A1 * | 8/2017 | Hansort | E04G 15/04 | |

FOREIGN PATENT DOCUMENTS

| | | | | | |
|---|---|---|---|---|---|
| AU | 2009217422 | A1 | * | 4/2010 | E04G 21/142 |
| AU | 2006251997 | B2 | * | 2/2012 | |
| AU | 2007202357 | B2 | * | 11/2013 | E04G 21/142 |
| AU | 2009217422 | B2 | | 1/2016 | |
| AU | 2012261677 | B2 | * | 9/2017 | |
| CN | 213336077 | U | | 6/2021 | |
| DE | 3423284 | A1 | | 1/1986 | |
| DE | 29720149 | U1 | * | 5/1999 | E04B 1/41 |
| FR | 2695952 | A1 | | 3/1994 | |
| NZ | 520149 | A | * | 1/2003 | E04G 21/142 |
| NZ | 573621 | A | * | 1/2012 | E04G 15/04 |
| NZ | 579819 | A | * | 1/2012 | |
| NZ | 593077 | A | * | 12/2012 | E04B 1/4142 |
| WO | WO-9424390 | A1 | * | 10/1994 | E04G 21/142 |
| WO | 9925941 | A1 | | 5/1999 | |

OTHER PUBLICATIONS

International Preliminary Report on Patentability issued on Sep. 28, 2023 for corresponding PCT Application No. PCT/AU2022/050723.
European Search Report issued Mar. 14, 2025 for counterpart European Application No. 22840858.9.
Chinese Office Action issued on Apr. 28, 2026 for corresponding Chinese Application No. 202280049232.9.

* cited by examiner

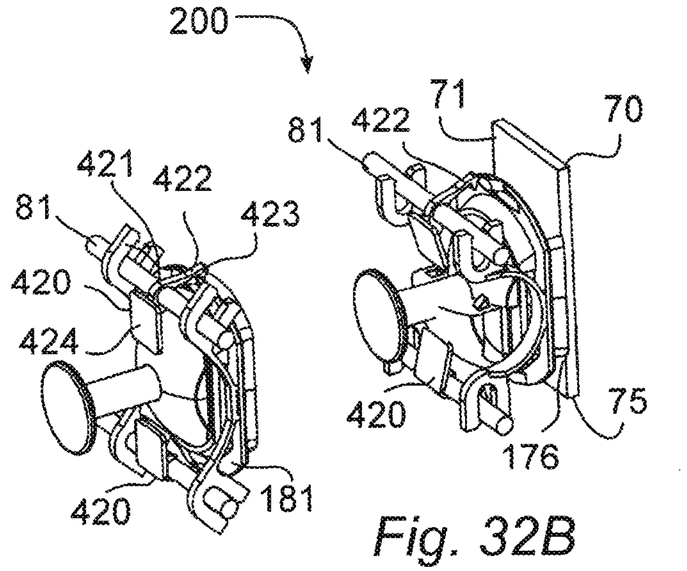
Fig. 32B
Fig. 32A
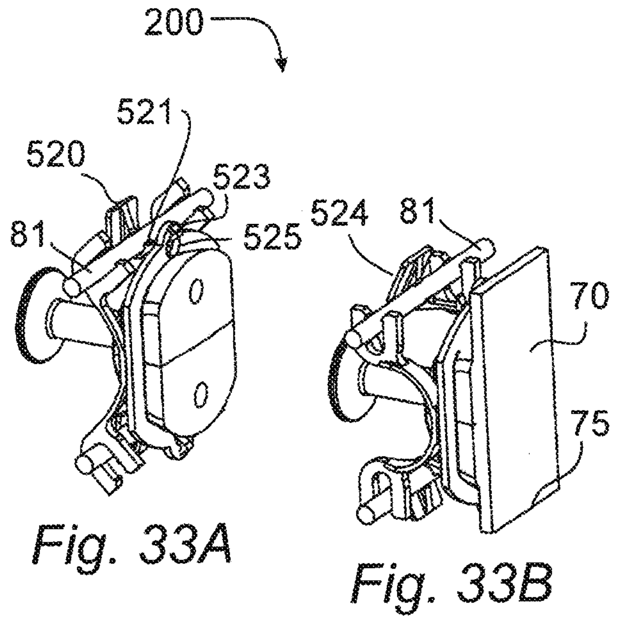
Fig. 33A
Fig. 33B

RECESS FORMER AND ANCHOR ASSEMBLY

CROSS-REFERENCE TO RELATED APPLICATIONS

This application is a national stage application (under 35 U.S.C. § 371) of PCT/AU2022/050723, filed Jul. 11, 2022, which claims benefit of Australian Application No. 2021902152, filed Jul. 14, 2021; Australian Application No. 2021902454, filed Aug. 9, 2021; Australian Application No. 2021902539, filed Aug. 15, 2021; Australian Application No. 2021902540, filed Aug. 15, 2021; and Australian Application No. 2021903061, filed Sep. 23, 2021, which are incorporated herein by reference in their entireties.

FIELD OF THE INVENTION

The present invention relates to a recess former and anchor assembly and to a method of forming a recess around a lifting anchor or other embedded item cast into a concrete element, in particular for attachment to the reinforcement cages for the manufacture of concrete elements including concrete pipes and the like.

BACKGROUND ART

Pipes and tubes manufactured from concrete provide an economical solution for the transport of potable water, drainage and sewage for civil engineering applications. Concrete pipes require relatively thick walls to resist the internal and external pressures and are therefore heavy and in most cases, they need to be lifted, handled and placed using mechanical lifting equipment.

The simplest method of lifting concrete pipes is to tie a rope or sling around the pipe close to its centre of gravity. This method requires either that the pipe be rolled over the rope or that there be a gap under the pipe to enable the sling to be passed under the pipe. Importantly, the sling can only be removed when there is a gap or the pipe rolled away. This method of lifting can be acceptable for small diameter, relatively lightweight pipes but becomes increasingly difficult and dangerous with large, heavy pipes. Unless the sling is exactly on the centre of gravity the pipe does not lift such that it is maintained level during the lifting and handling movements.

The most common alternative method is to cast a hole in the pipe wall at the centre of gravity. Because the hole is moulded into the pipe at the time of manufacture it is more easily arranged on the centre of gravity and is repeatably and reliably located for all pipes produced in the mould.

For lifting the pipe, a loop-eye of a sling is passed through the hole and a bar inserted through the eye from within the bore of the pipe such that when tension is applied to the sling, the bar contacts the bore of the pipe and anchors the sling to the pipe.

A disadvantage of this method is that it requires close supervision to ensure that the bar is of the required strength and is placed in such a way as to prevent its accidental withdrawal from the eye of the sling during load reversals.

After lifting, the bar is removed from the eye of the sling which is then pulled back through the hole which must be plugged.

Both methods are slow and cumbersome and during lifting and handling the pipe is able to see-saw about the sling, presenting handling difficulties, especially when pipes are often transported over rough ground during installation and then installed in narrow trenches.

A further problem arises after the pipe has been laid in the trench. It must be jointed to the previously laid pipes. After the pipe has been laid with its nose close to the bell-mouth of the previously laid pipe, the nose of the pipe is winched into the bell-mouth, over the rubber seal by using a winch is connected between the previously laid pipes and the new pipe. During the winching operation the bedding must either be removed from around the joint area or else it is pushed by the pipe nose into the joint. Another issue is that the nose of the pipe must be lifted into the bell-mouth and if it is forced in then it can damage the pipe joint and prevent a seal being effected.

The trailing flange of the bell-mouth also disturbs the bedding which requires additional levelling and compaction. Incomplete compaction results in joint instability during service which deteriorates joint security and pipeline performance.

After the pipe is laid the hole must be plugged to prevent the ingress of ground water and fill materials which lie above the pipe. If the hole is left without being plugged, the ingress of water and fill not only increases the hydraulic load of the pipeline and the risk of blockage, but also leads to deterioration of the fill over the pipe which can result in failure of the structures lying above the pipe, e.g. road failure.

In most cases it is not possible to cast a through-hole in the pipe wall because the former for the hole cannot extend to the inside surface without interrupting the pipe manufacturing process. For this reason, a blind hole is formed and there is a web of concrete between the bottom of the hole and the inside wall of the pipe.

The web of concrete is commonly removed by inserting a chisel from the outside of the pipe and striking with a hammer to break the web. Unfortunately, this method results in a cone shaped chunk of concrete being broken from the bottom of the hole which has the effect of making a small aperture very much larger. This thins and weakens the concrete wall over a large diameter around the hole, damages the compact, smooth interior wall, reduces the distance to the steel reinforcing, and in some cases exposing the reinforcing to corrosion. The damaged holes become further damaged during lifting and placing and are a significant cause of pipe deterioration over time, particularly as ground waters enter the hole and corrode the reinforcing. The broken chunks of concrete, if not removed, add to the burden of detritus within the pipe system, reducing flow and increasing the risk for blockage.

What is required is a directly coupled lifting system which does not require a sling around the pipe or a hole in the pipe, thereby significantly improving pipe handling and laying efficiency and improving pipeline performance and integrity.

One method of directly coupling a pipe is by casting an anchoring component into the pipe wall onto which may be attached an attachment device for connection to the hoisting system. Such lifting anchors are in widespread use for concrete elements. Such anchors are of a substantially elongate cylindrical or planar form and take the form of a free end shaped to connect to a connection device and another distal end which is shaped to form a mechanical interlock with the concrete in which it is embedded.

These lifting anchors are embedded in the concrete elements at the time of casting the concrete. When setting up the mould, the free end of the anchor which is shaped to attach to the lifting shackle is secured in a recess former. Most commonly the recess former is attached to the formwork or mould used to cast the concrete element. After the concrete has hardened and the mould or formwork is removed, the recess former is itself removed, leaving a recess in the surface of the concrete element such that the attachment end of the anchor is accessible.

There are special problems for casting such lifting anchors into the walls of pipes and other similar elements. The anchors must be capable of developing relatively high loads within the relatively thin walls of the pipe. Additionally, pipes are manufactured in closed or partially closed moulds which make the attachment of the anchor and its recess former difficult.

The mechanics of gripping the anchor and its recess former and their attachment to the mould or reinforcing to resist the significant centrifugal and other forces generated within the concrete during the pipe-making process makes the use of these anchors difficult for many pipe manufacturing processes.

Modern pipe making processes employ a stationary mould which is closed about a prepared reinforcement cage prior to being set into the pipe making machine.

The wall thickness as well as the distance between the outside diameter of the pipe and the reinforcing elements vary according to the design requirements for the strength of the pipes. In many cases a common mould is used for the manufacture of pipes with different wall thicknesses and different reinforcement configurations.

The concrete is cast by the pipe-making machine which flings or forces a relatively stiff mix of concrete through the reinforcement cage against the mould wall. This is commonly achieved by a rotating concrete spray head and/or internal rollers. The machine also incorporates a means of vibration of the mould assembly which continuously vibrates the concrete during the casting process to ensure the required degree of concrete compaction. The concrete flow, circumferential and differential motions between the concrete, reinforcement and mould give rise to complex forces generated within the concrete. Lifting anchors fastened directly to the reinforcement or the mould wall are therefore subject to significant dislodgement forces which generally precluded their utility. To overcome these problems some prior art applications have specially designed moulds fitted with mechanical means for rigidly locating lifting anchors in the moulds.

The capital cost and complication of mounting and dismounting anchors and recesses make the use of these types of anchors difficult for most modern and automated pipe making processes.

GENESIS OF THE INVENTION

The genesis of the present invention is a desire to provide an improved recess former assembly for the economical installation of lifting anchors in pipes which can be adapted to modern pipe manufacturing processes without the need to modify existing moulds or install special mechanical equipment. Modern pipe making methods require a distance adjustable recess former assembly which can automatically adjust to the distance between the mould and the attachment point for the recess former assembly which is generally the steel reinforcement cage and which can take into consideration the variable pipe wall thickness and reinforcement configurations.

Safety standards require the use of safe lifting systems for the handling and installation of concrete pipes and pipe-like products. The economical installation of lifting anchors in pipes is expected to improve lifting safety and efficiency, reduce handling costs, provide an efficient method for laying the pipes and by the elimination of holes significantly improve pipe life, pipeline performance, stability and long-term reliability.

In accordance with a first aspect of the present invention there is disclosed a recess former assembly for creating a recess surrounding a cast in situ lifting element in a cast concrete element having a cast outer surface, said assembly comprising:

a frame having locating lugs engageable with components of a reinforcing cage to be positioned within the mould in which said concrete element is to be cast, engagement of said locating lugs with said reinforcing components locating said frame in a rest position spaced from said mould, a removable recess former releasably retained in said frame, a lifting element retained within said recess former and having an anchor portion extending from said recess former, and a non-rigid interconnection between said lugs and said frame permitting said frame and recess former to be urged towards said mould into an operative casting position in which at least a portion of said recess former substantially abuts said mould.

In accordance with a second aspect of the present invention there is disclosed a method of holding a recess former for creating a recess surrounding a cast in situ lifting element in a cast concrete element having a cast outer surface, said method comprising the steps of:

positioning a frame having locating lugs relative to a reinforcing cage within the mould by engaging the locating lugs with components of the reinforcing cage to thereby locate the frame in a rest position spaced from said mould, releasably retaining a removable recess former in said frame, retaining a lifting element within said recess former, said lifting element having an anchor portion extending from said recess former, and providing a non-rigid interconnection between said lugs and said frame to permit said frame and recess former to be urged towards said mould in an operative casting position in which at least a portion of said recess former substantially abuts said mould.

Preferably, in accordance with a first embodiment there is disclosed an assembly comprising a concrete lifting anchor with an elongate body with a first end shaped to provide a head for connection to an attachment device and second end shaped to provide mechanical interlock with the concrete into which the said anchor is embedded, a removable recess former for forming a recess in a concrete surface and which envelops the said anchor head, said recess former being shaped with an interior cavity to receive the said anchor head and an exterior shape which defines the form of the said recess in the said concrete surface to receive the said attachment device and a frame element made of metal or plastics materials which is interlocked to the said recess former and provided with means for attachment to a reinforcement cage, pre-formed from wires or similar elements cast within the concrete element.

Preferably, in accordance with a second embodiment the said recess former is shaped with a lower surface dimensioned to receive the lifting device for attachment of the said lifting device to the said anchor head after the removal of the recess from the concrete element and an upper surface shaped to bear against the internal wall of the mould used to define the surface of the said concrete element Preferably, in accordance with a third embodiment the said recess former includes an attachment means to enable it to be firmly but removably attached to the said frame element.

Preferably, in accordance with a fourth embodiment the said frame element includes an attachment means with which it may be fixed to the said reinforcement cage.

Preferably, in accordance with a fifth embodiment the said attachment means is configured to permit movement in a direction substantially parallel to the said body of the said anchor to provide a means of adjustment to accommodate a variable distance between the said reinforcement cage and the said mould wall such that the upper surface of the said recess former of the said assembly may be positioned adjacent to the said mould wall either before or during the concrete casting process.

Preferably, in accordance with a sixth embodiment the said adjustment means is configured such that after fixture of the said assembly to the said reinforcement cage the said distance adjustment may be achieved without external manual or mechanical intervention other than by either closure of the said mould around the said reinforcement cage or by the pressure of the concrete bearing against one or more elements of the said assembly.

Preferably, in accordance with a seventh embodiment the said attachment means are formed as slotted clips, shaped to permit movement in a direction parallel to the axis of the said anchor.

Preferably, in accordance with an eighth embodiment the said slotted clips are shaped with a first open end shaped to permit the entry of the said wires of the said reinforcement cage, and a second closed end spaced at some distance from the said first end and a longitudinal axis between the said first and second ends.

Preferably, in accordance with a ninth embodiment, one or more of the said slots of the said slotted clips may have a longitudinal axis which is formed at an angle to the axis of the said anchor over at least some part of the length of the slot.

Preferably, in accordance with a tenth embodiment, the said open ends of the said slots of the said slotted clips is shaped with a restricted slot width to provide a restraint against the escape of the said wires.

Preferably, in accordance with an eleventh embodiment, either the said first or second end of the said slots of the said slotted clips is shaped with an enlarged slot width to provide a means of initial positioning the said assembly on the said wires prior to closure of the said mould around the said reinforcement cage.

Preferably, in accordance with a twelfth embodiment the said frame element includes a spring actuated distance adjustment means which provides a means of accommodating a variable distance between the said upper surface of the said recess former of the said assembly and the said reinforcement cage.

Preferably, in accordance with a thirteenth embodiment the said recess former assembly is configured to contain a spring pressure release mechanism which can be actuated by pressure of the closure of the mould against a trigger arm or the body of the recess former or by contact pressure by concrete against some part of the spring release mechanism or by vibration of the assembly during the casting of the concrete.

Preferably, in accordance with a fourteenth embodiment there is disclosed a recess former assembly comprising a lifting anchor with a head, a removable recess former which envelops the said anchor head for forming a recess in a concrete surface and a frame element which is interlocked to the said recess former and provided with means for attachment to a reinforcement cage, pre-formed from wires or similar elements manufactured from metals or plastics materials cast within the concrete element and at least one separate clip attached to the said wires lying adjacent the said means of attachment which prevents movement of the said attachment in a direction parallel to the longitudinal axis of the said wires.

Preferably, in accordance with a fifteenth embodiment the said recess former may comprise a body hinged adjacent the said upper surface to enable it to be opened and closed by a pivotal movement about the anchor head. The said recess former may comprise multiple separable bodies which form a single body when fitted together.

Preferably, in accordance with a fifteenth embodiment there is disclosed a said removable recess former for the casting of a said anchor in a concrete element wherein the said recess former has a curved surface which lies adjacent to the curved surface of the mould for the said concrete element.

Preferably, in accordance with an sixteenth embodiment there is disclosed an assembly comprising a lifting anchor with a head, a removable recess former which envelops the said anchor head for forming a recess in a concrete surface and a frame element which is interlocked to the said recess former and provided with means for attachment to a reinforcement cage, pre-formed from wires or similar elements manufactured from metals or plastics materials cast within the concrete element in which the said concrete element is a pipe or a pipe-like element cast within a mould which has a curved surface.

Preferably, in accordance with a seventeenth embodiment there is disclosed a concrete element which has a curved surface with a recess in said curved surface and an anchor having a head being embedded in said concrete element with said head located in said recess, wherein the top of said head is proximal with said curved surface.

Preferably, in accordance with an eighteenth embodiment there is disclosed a method of casting a concrete element which incorporates a reinforcement cage, and at least one anchor having a head and being embedded in the concrete of said concrete element with said head being located in a recess formed in a surface of said element, said method comprising the steps of:

(i) placing a recess former so as to enclose the said anchor head,
(ii) interconnecting said recess former with an attachment frame to make a rigid assembly
(iii) interconnecting said assembly to a reinforcement cage to be enclosed within a mould to form a concrete element
(iv) closure of the mould around said reinforcement cage and said assembly such that when closed, the upper surface of the said recess former is located substantially adjacent the surface of said mould
(v) casting of said concrete element
(vi) movement of the said assembly against the surface of the said mould during the casting process, caused by pressure of the concrete bearing against a part or part of the said assembly or causing the release of a spring-loaded retention mechanism.
(vii) removal of said recess from said concrete element to expose the said anchor head.

Preferably, in accordance with a nineteenth aspect embodiment there is disclosed a method of casting a concrete element which incorporates a reinforcement cage, and at least one anchor having a head and being embedded in the concrete of said concrete element with said head being located in a recess formed in a surface of said element, said method comprising the steps of (i) placing a recess former so as to enclose the said anchor head,
(ii) interconnecting said recess former with an attachment frame to make a rigid assembly
(iii) interconnecting said assembly to a reinforcement cage to be enclosed within a mould to form a concrete element
(iv) closure of the mould around said reinforcement cage and said assembly such that when closed, the upper surface of the said recess former is located substantially adjacent the surface of said mould
(v) release of a spring-loaded retention mechanism which permits the closure of the said assembly against the surface of the said mould
(vi) casting of said concrete element and removal of said recess from said concrete element to expose the said anchor head

BRIEF DESCRIPTION OF THE DRAWINGS

Embodiments of the present invention will now be described with reference to the drawings in which:

FIG. 32A is a rear isometric view of an eighth embodiment of the present invention showing a mould part descending, FIG. 32B is the same as FIG. 32A with the mould in position, FIG. 33A is a frontal isometric view of a ninth embodiment of the present invention showing a mould part descending toward the invention, FIG. 33B is the same as FIG. 33A with the mould in position.

DETAILED DESCRIPTION

Figure 1:
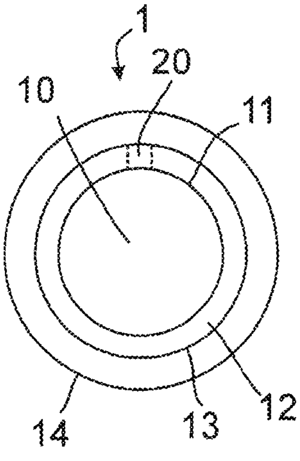
Fig. 1 PRIOR ART
FIG. 1 is an end elevation of a prior art concrete pipe with a lifting hole.
Figure 2:
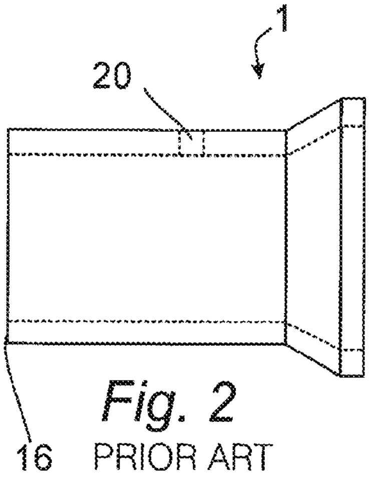
Fig. 2 PRIOR ART
FIGS. 2 and 3 are a side elevation of the pipe of FIG. 1.
Figure 3:
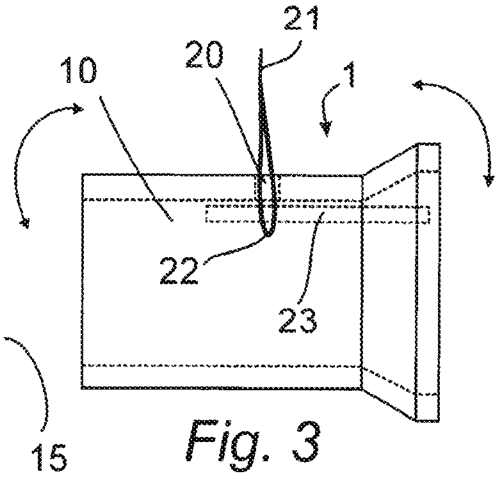
Fig. 3 PRIOR ART

Turning now to FIGS. 1 to 3, a prior art lifting hole 20 is shown in the top of the wall 12 between the inside surface 11 of the bore 10 and outside surface 13 of a concrete element 1, in this case a concrete pipe. The pipe 1 has a nose end 16 and an opposing bell-shaped end 15 formed by a tapered flange 14 of larger diameter than the diameter 13 of the pipe 1.

The pipe 1 is lifted with a sling 21 with a loop-eye 22 which is inserted into the lifting hole 20 of the pipe and terminated in the bore 10 of the pipe by passing a bar 23 through the loop eye 22. When lifting by this method, the pipe 1 is unstable and may rotate about the lifting hole 20, shown by the arrows in FIG. 3.

Figure 4:
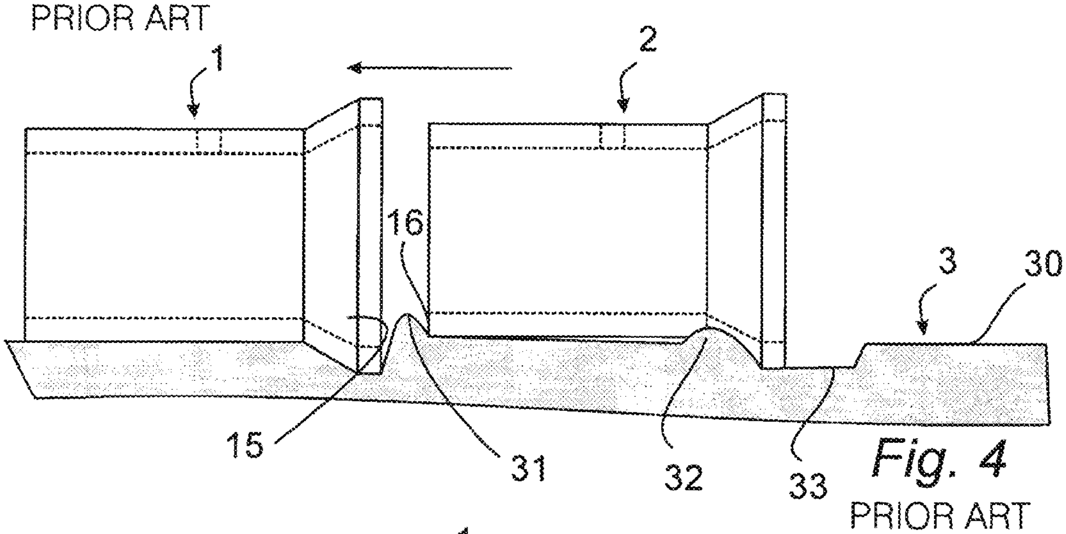
Fig. 4 PRIOR ART
FIG. 4 is a side elevation of two prior art concrete pipe being joined together.

FIG. 4 shows two concrete pipes 1,2 having been lifted and placed onto a previously graded bedding material 3 with a surface 30 surveyed to provide the correct fall for the pipeline. The pipes are joined by thrusting the second pipe 2 toward the first pipe 1 in the direction shown by the arrow so as to cause the nose 16 of pipe 2 to enter the bell mouth 15 of the first pipe 1 to make the joint. Movement of the nose 16 across the surface 30 of the bedding material 3 causes a wave like disturbance 31 ahead of the nose 16 which may enter the bell mouth 15 of the first pipe 1, thereby degrading the quality of the joint.

In addition a second wave-like disturbance 32 of the bedding 3 results from the tapered exterior surface of the bell-mouth of the second pipe 2 being thrust across the surface 30 of the bedding 3, leaving an uncontrolled depression 33 in its wake which requires filling and compaction.

It is apparent that the passage of the nose 16 of pipe 2 into the bell mouth 15 of pipe 1 and the final closure can be difficult to achieve and risks damage to the nose 16 of the pipe 2 being closed.

Figure 5:
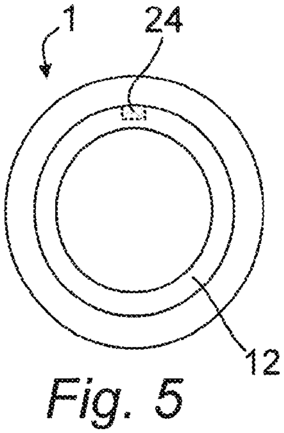
Fig. 5 PRIOR ART
FIG. 5 shows the pipe of FIG. 1 with the former for making the lifting hole.
Figure 6:
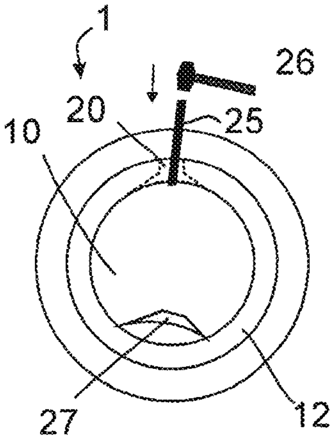
Fig. 6 PRIOR ART
FIG. 6 is the pipe of FIG. 5 with the lifting hole former removed and the hole being punched through with a hammer and chisel.
Figure 7:
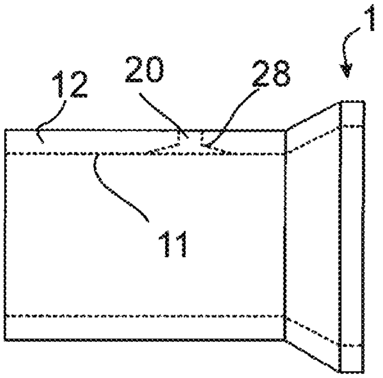
Fig. 7 PRIOR ART
FIG. 7 is a side elevational view of the pipe of FIG. 6 after the lifting hole has been punched through to the bore of the pipe.

FIGS. 5, 6 and 7 show the damage which results after the as-cast well 24 for the lifting hole 20 is opened by punching through the incomplete hole 24 moulded into the wall of the pipe.

Complete perforation of the pipe wall 12 is achieved by introducing a chisel 25 or similar implement into the moulded well 24 and punching through to the bore of the pipe 10 using a hammer 26. A substantially cone-shaped piece of concrete 27 is broken from the bottom of the well 24 and falls into the bore 10 of the pipe 1, leaving a broken and uneven conical surface 28 in the inside surface 11 of the pipe, opening to the lifting hole 20.

This broken surface 28 and irregular hole 20 results in uncontrolled thinning and loss of strength of the pipe wall 12 in the vicinity of the lifting hole 20 and exposes the concrete and any reinforcement embedded therein to corrosion from ground waters infiltrating into the hole 20 or pipeline waters being forced out under pressure.

Figure 8A:
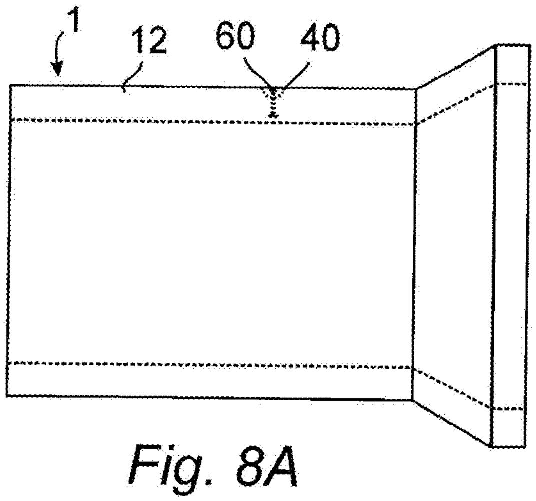
Fig. 8A PRIOR ART
FIG. 8A is a side elevational view of a single lifting anchor embedded in the wall of a concrete pipe.
Figure 8B:
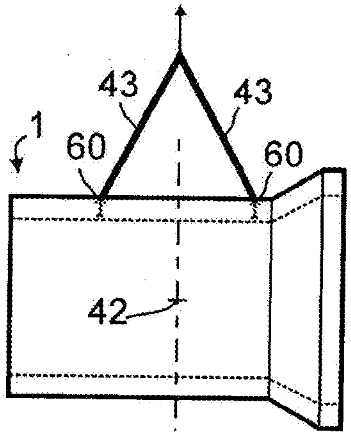
Fig. 8B PRIOR ART
FIG. 8B is a side elevation of a concrete pipe being lifted with two lifting anchors embedded in the wall of the pipe.

FIG. 8A shows a single prior art lifting anchor 60 as is sometimes embedded within its surrounding recess 40 which is moulded during casting with a removable recess former 50, in the wall 12 of a concrete pipe 1. FIG. 8B shows a superior arrangement with two lifting anchors 60 optimally located in a pipe 1 equidistant from the centre of mass 42 and lifted with equal length slings 43. It is evident that this arrangement is far more stable during lifting and placing and therefore superior in every way to lifting a pipe with a single lifting point located on the centre of gravity 43 as shown in the previous FIG. 8A.

The two anchors shown in FIG. 8B provide convenient anchor points for the jacking of the pipes as shown in FIG. 4 and the difficulties in closure of the pipes as explained above may be overcome by using differential slinging forces developed between slings of different leg length 43 attached to the anchors (not shown).

Figure 9A:
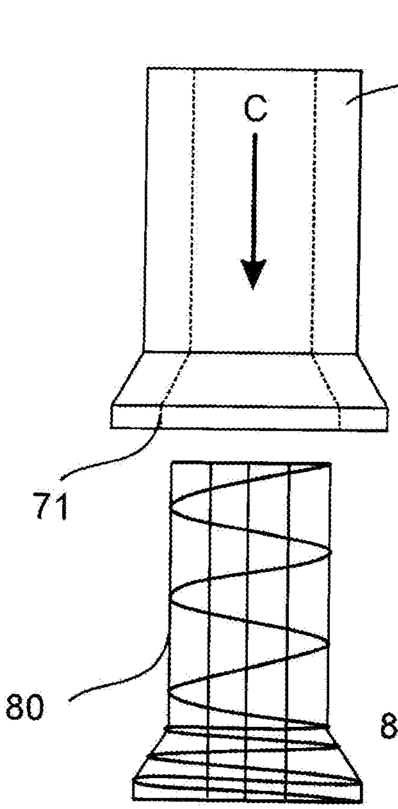
Fig. 9A PRIOR ART
FIGS. 9A, 9B and 9C are side elevations showing the stages when lowering a pipe mould over the reinforcement cage of a vertical pipe casting process using prior art anchors and recess formers.

A significant problem exists for the placement of the lifting anchors 60 with their recess formers 50 when pipes 1 are manufactured by the vertical casting method. FIG. 9A shows a reinforcement cage 80 standing vertically prior to the closure of the vertical pipe mould 70 over the cage 80 in the direction of arrow C.

Figure 9B:
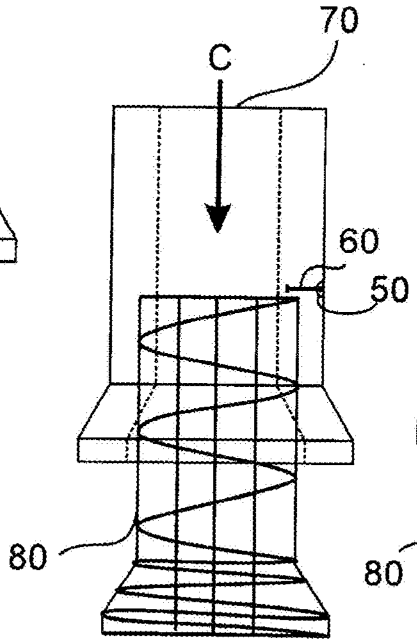

FIG. 9B shows the pipe mould 70 being lowered over the cage as shown in FIG. 9A. It will be appreciated that if the anchors 60 and their recess formers 50 are attached to the pipe mould 70 and therefore project from the inside surface 71 of the mould 70 then there is the danger that the recess former 50 and anchor 60 will strike the reinforcement cage 80 and be dislodged. Furthermore, in many cases the anchors 60 are required to be embedded at a larger distance 91 than the distance between the reinforcement cage 80 and the mould wall 71 shown in FIGS. 15 and 16.

Figure 9C:
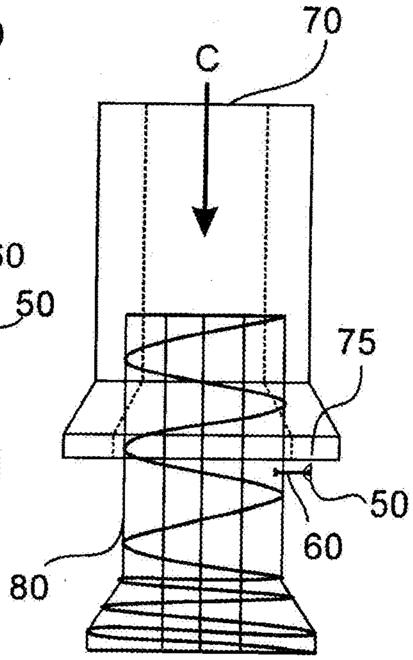
Fig. 9C PRIOR ART
Figure 10:
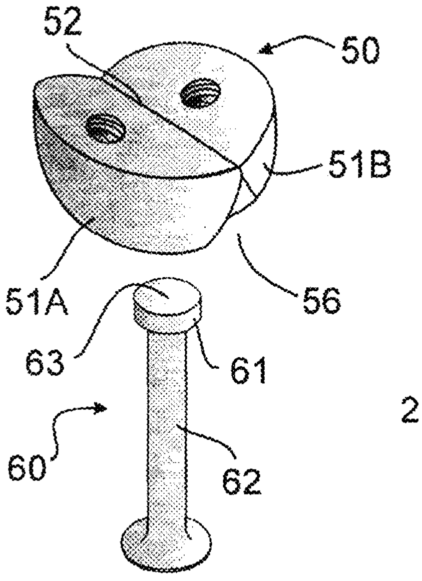
Fig. 10 PRIOR ART
FIG. 10 is an exploded perspective view of a prior art recess former and a round bodied lifting anchor.
Figure 11:
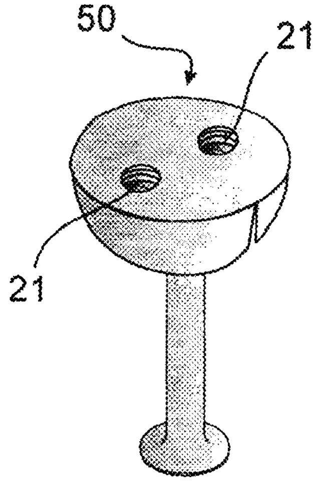
Fig. 11 PRIOR ART
FIG. 11 shows the prior art recess former of FIG. 10 closed about the anchor.
Figure 12:
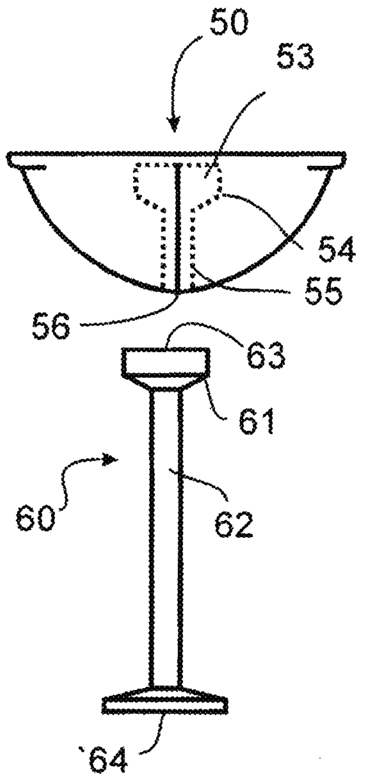
Fig. 12 PRIOR ART
FIG. 12 is a side elevation of the prior art recess former and anchor of FIG. 10.

On the other hand, as shown in FIG. 9C if the recess formers 50 and their enclosed anchors 60 are fixed to the reinforcement cage 80 there is the danger that the end 75 of the mould 70 may strike and dislodge the anchor 60 and/or its recess former 50 from the cage 80 as the mould 70 is lowered over the cage 80.

It can therefore be appreciated that whilst it is possible to attach prior art recess formers 50 and their enclosed anchors 60 lifting anchors 60 directly to the mould 70 or the reinforcement cage 80, it is not generally practical for many pipe manufacturing methods, particularly vertical pipe manufacturing methods.

FIGS. 10-14 show the typical types of prior art recess former designed to co-operate with a round bodied anchor 60 having a forged head section 61 and a cylindrical body 62 of lesser diameter.

The recess former 50 is of a hemispherical shape formed in two halves 51A and 51B hinged in the centre 52 and separated by a transverse slot 56 which receives the attachment end 61 of a lifting anchor 60. The interior cavity 53 is shaped to receive the enlarged head 61 and lesser body 62 of lifting anchor 60 and restricts the anchor 60 from moving or being dislodged from the former 50 during casting of a concrete element.

Figure 13:
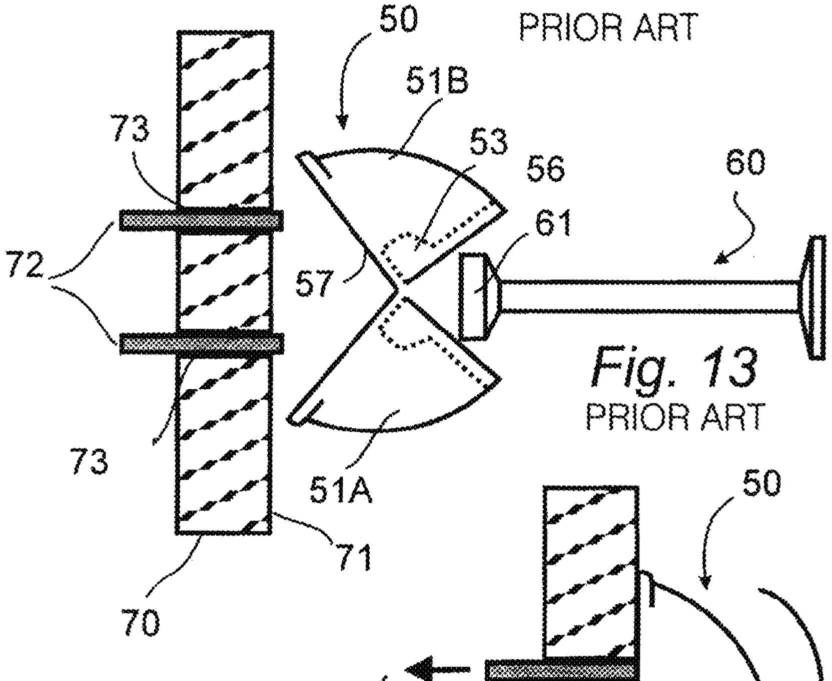
Fig. 13 PRIOR ART
FIG. 13 is a side elevational view of a prior art recess former in its open configuration to accept a round bodied anchor before being attached to a mould.
Figure 14:
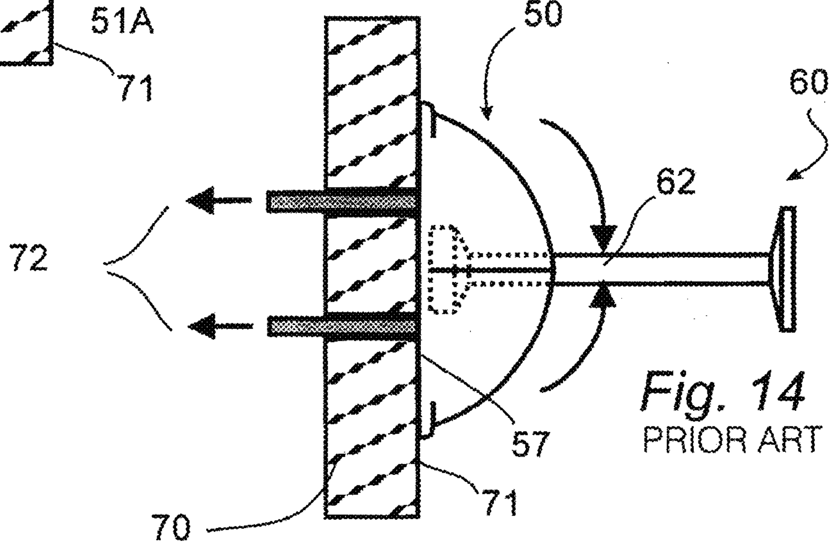
Fig. 14 PRIOR ART
FIG. 14 shows the prior art recess former of FIG. 10 closed about the round bodied anchor and mounted on a mould wall.

FIGS. 13 and 14 depict how the anchor 60 is fitted into the recess former 50 and then attached to the surface 71 of a flat mould wall 70 by mounting bolts 72 fitted into receiving nuts 21 (FIG. 11) in each half 51A and 51B of the recess former 50. Such a flat mould is used for concrete panels. When the bolts 72 are drawn through the holes 73 passing through the mould wall 70, the two halves 51A and 51B of the recess former 50 are maintained in the closed position, firmly gripping the anchor 60 and closing the rear surface 57 of the recess former 50 against the surface 71 of the mould wall 70.

A principal disadvantage of the prior art recess formers 50 is that they require mechanical attachment to the mould wall 70 to maintain a closing force to be applied to the recess former 50 to ensure complete closure of the two halves 51A, 51B about the anchor 60 so as to ensure that the anchor 60 does not move away from its optimum position within the recess former 50 during the spin casting operation in which the mould is rapidly rotated about the longitudinal axis of the pipe. Alternatively, for pipe making processes using roller compaction or vertical casting methods, aggressive vibration and/or shearing forces are applied to the concrete to ensure full compaction of the concrete prior to curing.

Figure 15:
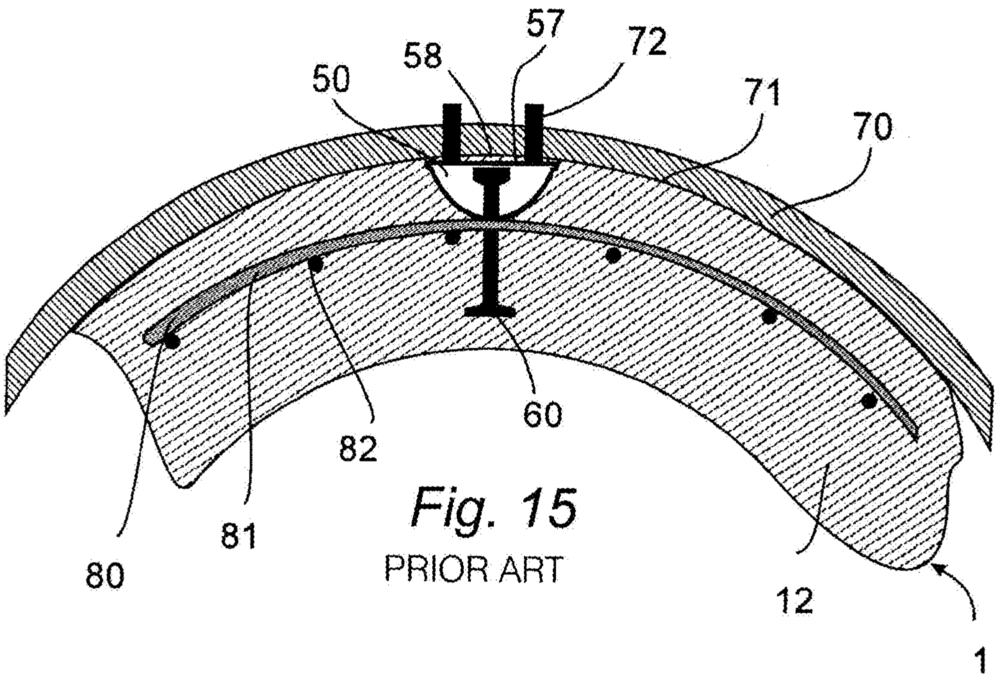
Fig. 15 PRIOR ART
FIG. 15 shows a vertical cross-section of a concrete pipe in its mould after casting with a prior art anchor and recess former of FIG. 10 attached to the mould wall.

FIG. 15 shows the anchor 60 located within a prior art recess former 50 attached by bolts 72 through the mould wall 70 (only part of which is illustrated) together with the steel reinforcing 80 and concrete of the pipe 1.

The prior art recess formers 50 are principally used for attachment to flat formwork and so the rear surface 57 of the recess former 50 is flat when the recess 50 is completely closed about the anchor 60. It is readily seen from FIG. 15 that this leaves a gap 58 between the rear surface 57 of the recess 50 and the inside surface 71 of the mould wall 70. This gap fills with concrete during casting of the pipe making extraction of the recess former 50 difficult from the cured concrete pipe as is required to expose the anchor 60 for connection to the device (not shown). In addition, this gap reduces the concrete thickness and hence the stability of the recess/anchor assembly and increases the risk for dislodgment.

Figure 16:
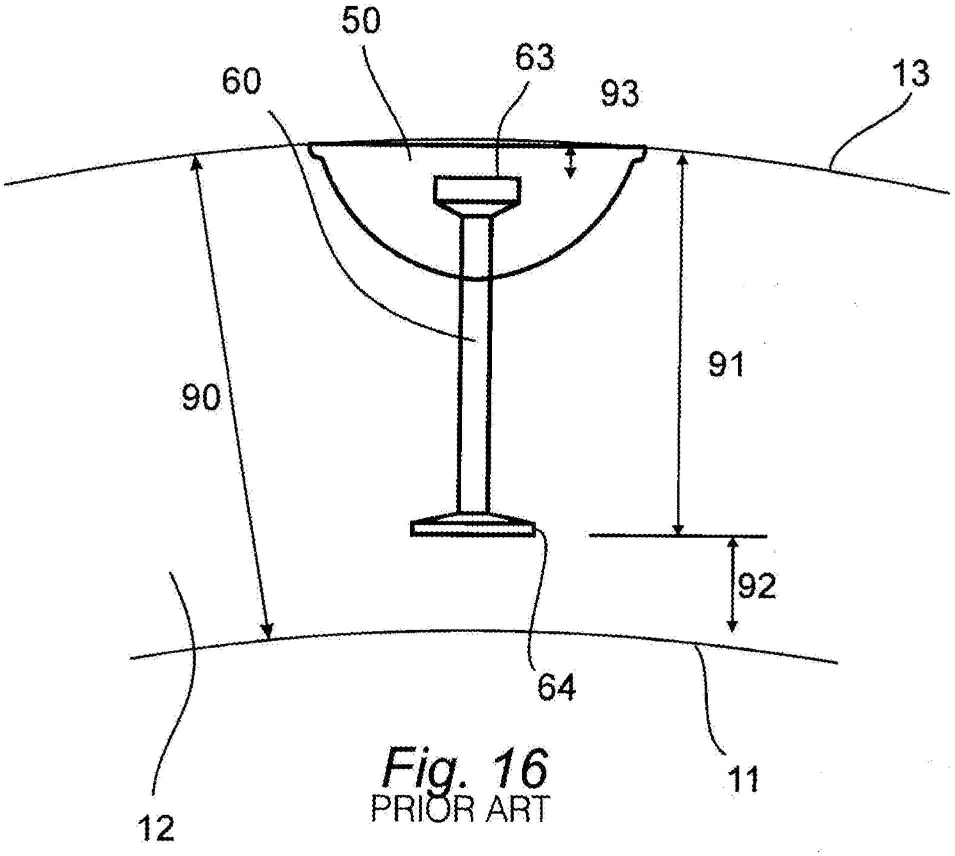
Fig. 16 PRIOR ART
FIG. 16 is a diagrammatic representation of the cross section of FIG. 15 showing the geometric relationship between the anchor, recess and concrete pipe wall.

It can be seen from the diagram in FIG. 16 that the wall thickness 90 of the pipe 1 is the sum of the distances 91 (being the nominal embedment depth from the surface of the concrete 13 to the bottom of the anchor 64), and the cover distance 92 (being the distance between the bottom of the anchor 64 and the inside surface of the pipe 11). The distance 93 between the top of the anchor 63 and the surface of the pipe 13 represents the degree to which the head of the anchor is embedded with the pipe 1.

The force resisted by tearing the anchor from the pipe wall 12 is proportional to the embedment depth 91 and for any particular anchor it is always desirable to locate the bottom of the anchor 64 as deeply into the concrete as possible. Since the pipe wall thickness 12 varies considerably for a range of pipe diameters and according to the service conditions required of the pipe, for a given cover 92 there is a wide range of anchor lengths to achieve the optimum anchorage. In practice, it is neither practicable nor economic to manufacture such a range of anchor lengths and so standard length anchors are used for many different pipe sizes, and so the depth of anchorage 91 varies accordingly.

Ideally the head 63 of the anchor 60 should be located close to, or adjacent to, the inside surface 71 of the mould to permit a wider range of embedment depths 91 to maximise the pull out strength of the anchor 60 from the concrete element 1 according to wall thickness 90 and weight of the concrete element 1, for a given anchor embedment depth, Judicious choice of the embedment depth 91 minimises the inventory of anchors 60 required for the manufacture of a wide range of pipe dimensions and weights.

The inventor has determined that it would be desirable to allow the former 50 to be closed around the anchor head but not physically attached to the mould wall 70, thereby eliminating the need for attachment holes to be provided in the mould wall 70 and substantially eliminating the distance 93. This is not practically possible with the prior art recess formers 50 because the hinged halves 51A and 51B of the recess formers 50 shown in FIGS. 10, 11, 12, 13 and 14 are free to open even under minor loads and/or vibrations unless restrained by a pulling force applied between the mould surface 71 and the body of the recess former 50. There is therefore a minimum set distance 93 between the rear surface 57 of the recess former 50 which is created by the need for the hinge section 52.

There is a further significant disadvantage for the pipe manufacturer using prior art recess formers 50 with the bolt holes 73 in the mould wall 70 for the attachment of the recess 50. Sometimes the moulds 70 are used in combination with other mould sections to make different length pipes and other products where the location of the centre of gravity 42 shown in FIG. 9 will change, for instance where the body section of a pipe is used for a plain pipe and also a flanged ended pipe. As a consequence, the moulds 70 need to be drilled with a multiplicity of holes for the attachment bolts. This results in degradation in the quality of the moulds 70 and the products cast against them. This hole drilling is also time consuming, has obvious cost implications for manufacturers, and may result in a poor-quality finish of the concrete component at the position of the stopped holes as a result of imprinting of the holes or their stopping material upon the concrete cast against them.

Differential movement during the pipe making process between the anchors 60 and recess formers 50 in the mould 70 and the adjacent pipe reinforcing elements 80 leads to forces being transmitted to the anchors 60 and recess formers 50 which either prevent complete closure of the recess formers 50 about the anchor 60, or lead to dislodgement from the mould wall 71. Such forces commonly result from leverage developed between the anchor 60 and reinforcing 80 and/or movement during the setting up of the reinforcing 80 within the mould 70 and then during the aggressive processes involved with pouring, vibrating, compacting and/or spinning the concrete. These forces may prise open the recess former 50 during the casting process thereby creating spaces between the anchor 60 and the recess former 50 which permit the entry of cement laden waters, or cement paste, into the interior cavity 53 of the recess former 50.

These problems become more significant when the dimensions and mass of the pipe 1, reinforcing 80 and anchors 60 increase.

After the concrete has hardened, the mould 70 and recess former 50 are removed thereby exposing the attachment end of the anchor 60 inside the recess formed by the removal of the recess former 50.

When using prior art recess formers 50 as described above, cement which has flowed into spaces between the recess former 50 and the anchor 60 makes the connection of the lifting shackle, or other attachment device, difficult or impossible. This cement is extremely difficult to remove because the anchor 60 is located below the surface of the concrete 13. The removal of the hardened cement is impeded by the confining space of the walls of the recess formed in the concrete by the recess former 50.

Increasingly modern pipe-making plants manufacture pipes by the vertical casting process in which the pipe mould 70 is closed over a prepared reinforcement cage 80, both of which are aligned in the vertical direction. In some processes the mould 70 is hinged along one side to enable it to be opened and closed however in others the moulds are completely closed. It can be realised that it is not practically feasible to fix an anchor 60 and recess former 50 to the mould 70 because this would require penetration of the mould 70 by the fixing mechanism 72 otherwise the mould 70 could not be withdrawn from the cast pipe 1 after casting. Some prior art solutions to this problem involve the expensive and complicated addition of mechanical devices to the mould 70 for the insertion and withdrawal of a recess former 50 for placement of inserts 60. These solutions are not generally practical for retrofitting to existing manufacturing plant.

What is desirable is a method of casting a recess around the anchor, and of retaining the anchor tightly in its correct position in such a way that the integrity of the recess is not compromised during the casting process and which guarantees that after removal of the recess former that the attachment aperture will be clean and free of cement, or other fouling materials. Additionally, a recess former which may be closed around the head of the anchor, and which does not require an outside closing force to enable it to remain properly intact, would be of great benefit to modern production facilities where it is not desirable to damage the walls of the mould by drilling or other attachment means. Additionally, a recess arrangement is desirable which reliably locates the attachment end of the anchor against the inside surface of the mould to maximise embedment for a minimum range of standard anchor lengths and spaces the reinforcing at the desired distance from the outside and inside surfaces of the pipe.

It would also be desirable if the anchor and its recess could be attached to the reinforcing cages 80 prior to their introduction to the moulds, so that there is no need for special moulds or alterations to moulds or for the need to attach or remove elements from moulds. In other words, for a system which can be used with existing moulding equipment without the need for alteration, or additional major capital equipment.

Figure 16A:
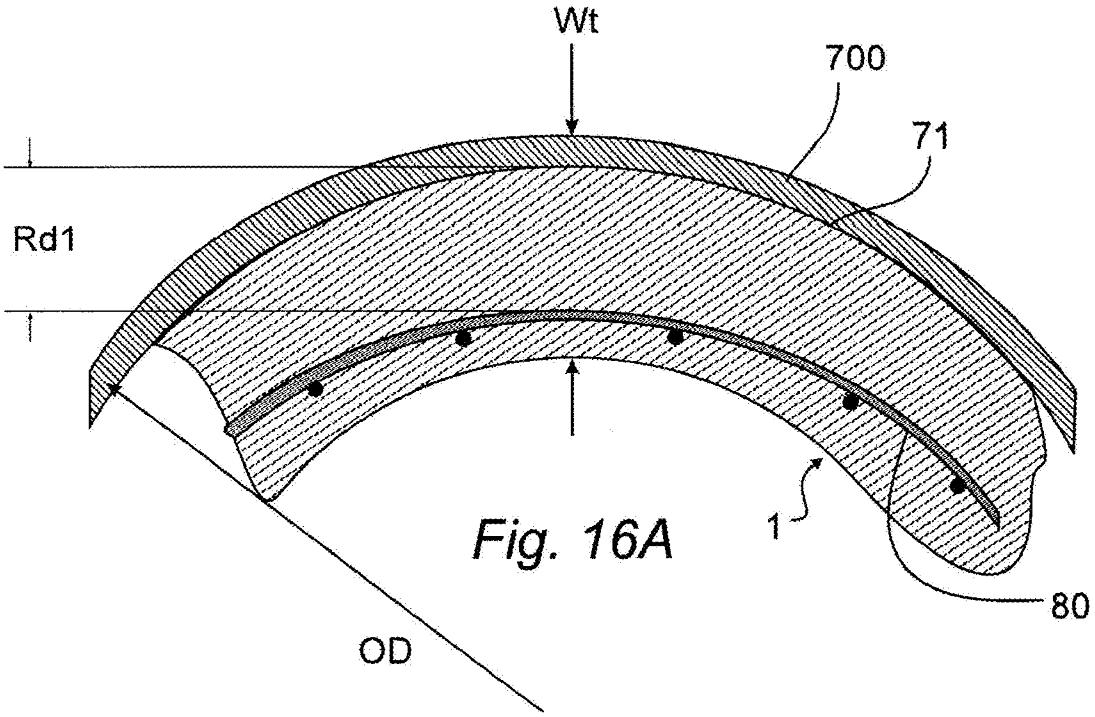
FIG. 16A is a vertical cross section of a concrete pipe element with a reinforcement cage at a distance Rd1 from the outside diameter of the pipe.
Figure 16B:
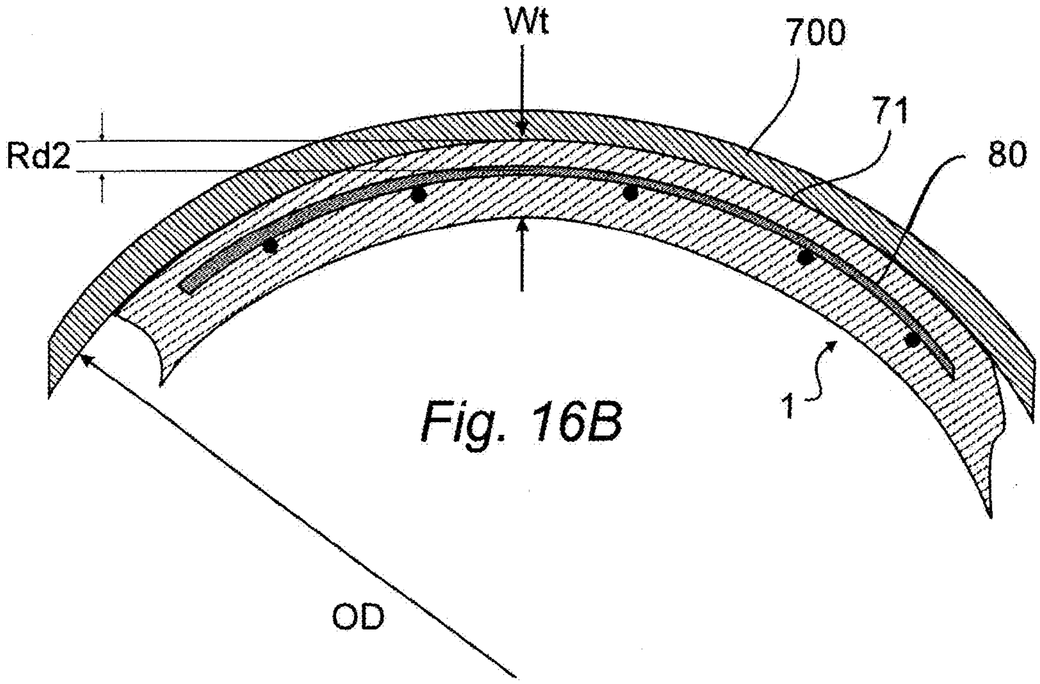
FIG. 16B is similar to FIG. 16A but with a smaller distance Rd2 between the outside diameter of the pipe and the reinforcement cage.

There is a further complicating problem for the attachment of the recess former 60 and/or its anchor to the reinforcement cage which can be realised by reference to FIGS. 16A and 16B. For the same outside mould 70 with diameter OD, the distance Rd1 and Rd2 between the inside wall 71 of the mould 70 and the reinforcement cage 80 can vary with the design of the concrete element 1. FIG. 16A shows a distance Rd1 which is greater than distance Rd2 in FIG. 16B for the same distance OD which in this case is the outside diameter of the pipe element 1.

If the recess former 50 and/or its enclosed anchor 60 were to be fixed to the cage 80, a wide range of fixings would be required to cater for the many different variations in distances Rd which vary according to the wall thickness and required Rd to meet the design strength requirements of the concrete element 1. Whilst the FIGS. 16A and 16B indicate the situation for pipe like elements, it can be realised that other elements with flat walls of varying thickness and reinforcement configurations will be subject to the same issues.

Turning now to the preferred embodiment of the present invention shown in FIGS. 17, 18, 19, 20, 21, 22 and 23, a recess former assembly 200 with a recess former 150 adapted for use with round bodied anchors 60 is shown. The recess former 150 takes the form of two separable parts 151A and 151B which are able to be closed about the head 61 of the anchor 60. This recess former includes a location means shown as a socket 153 (FIG. 22) formed into one side of the recess half part 151B and into which fits a plug 154 formed into the other half recess 151A. The location means 153 and 154 ensure that the two parts 151A and 151B of the recess former 150 remain positionally aligned when clamped together. The enlarged anchor head 61 is mechanically interlocked in the shaped cavities 155 within each half 151A and 151B of the recess former 150 and prevented from dislodgment whilst the halves 151A and 151B are physically clamped around the anchor and located by the socket 153 and plug 154.

Figure 23:
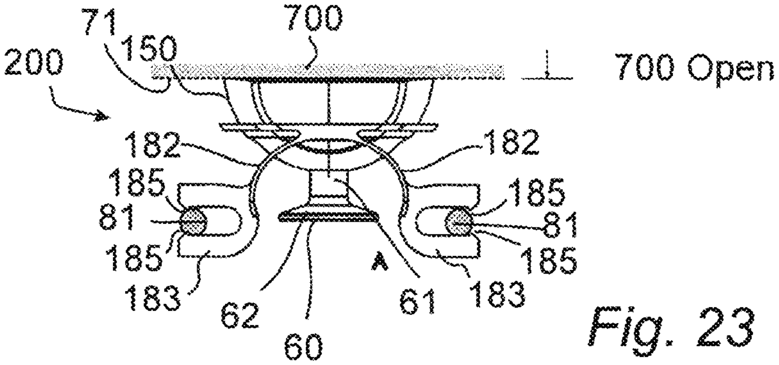
FIG. 23 is a similar view to FIG. 20 with the arrangement attached to the wires of a reinforcement cage.

The outer surface 178 of the recess former 150 is shaped to fit the inside surface 71 of the mould. In the preferred embodiment the surface 178 has a shape which is outwardly convex so as to fit closely against the inside wall 71 of a mould 70 for making a pipe (only part of which is illustrated in FIG. 23).

A preferred embodiment of the assembly 200 has a recess former 150 fitted into and attached to a surrounding frame 180 preferably made of plastics material. The frame 180 has a substantially closed ring section 181 with an upper surface 181A and a lower surface 181B from which extend non-rigid arms 182 of an arcuate form which act as springs and which enable deflection in a direction normal to the surface 178 of the mould 70 by flexure of the arcuate arms 182 when pressure is applied to the upper surface 178 of the recess former 150. The arms 182 are terminated with one or more clips 183 for attachment of the frame 180 of the assembly 200 to the reinforcing wires 81 or 82 of the reinforcing cage 80, of the concrete element 1 prior to casting. A slot 184 is formed into each clip with an open entry shaped with a restriction 185 which is dimensioned to allow the clip 183 to be attached to the wire 81 but to prevent the frame 180 from disengagement once it has been clipped into position. This provides a useful means of retaining the assembly 200 in the optimum position relative to the wall of the pipe mould 70 during casting of the concrete pipe 1.

FIGS. 17, 18, 21 and 22 show the assembly 200 clipped onto the reinforcement wires 81 of the reinforcement cage 80 prior to the cage being enclosed by the mould 70.

Figure 19:
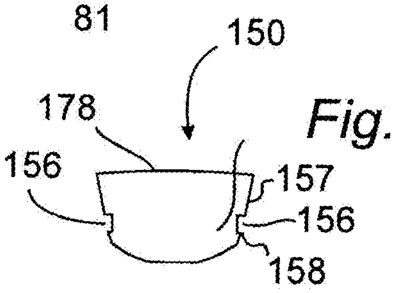
FIG. 19 is an end view of the recess former of the embodiment of FIG. 17.
Figure 20:
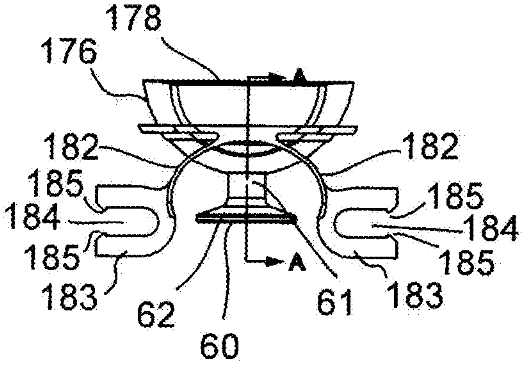
FIG. 20 is a side elevational view of the embodiment of FIG. 17.
Figure 21:
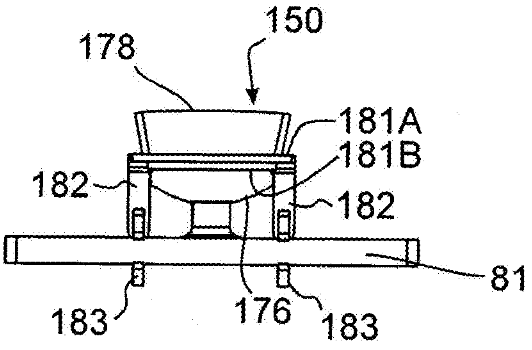
FIG. 21 is an end view of the embodiment of FIG. 17 attached to the wires of a reinforcement cage of a concrete element.
Figure 22:
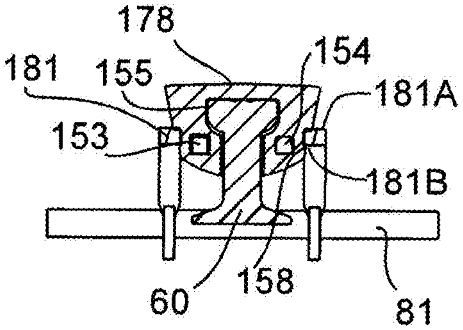
FIG. 22 is a vertical cross-section at A/A of FIG. 20 assembled on the wire of a reinforcement cage.

FIG. 19 shows the preferred embodiment of the recess former 150 where the sides 157 are recessed with a fixture slot 156 the lower lip 158 of which interlocks with the underside 181B of the frame 181 shown in FIG. 22 to provide a simple means of rigidly fixing the recess former 150 into the frame 180.

Figure 17:
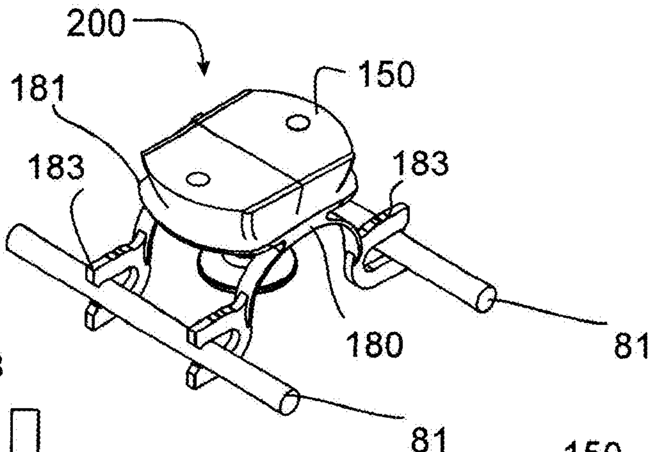
FIG. 17 is an isometric view of a preferred embodiment of the present invention.
Figure 18:
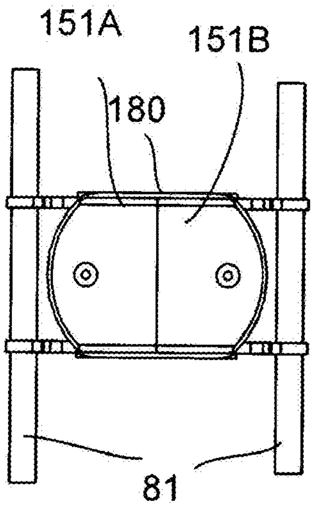
FIG. 18 is an inverted plan view of the embodiment of FIG. 17.

FIG. 23 demonstrates the positioning of the reinforcing cage 80 together with the preferred embodiment of the attached recess assembly 200 shown in FIG. 17 relative to the inside surface 71 of the mould 70 prior to closing the mould 70. With the mould in the open position the upper surface 178 of the recess former 150 may be just clear of, or in contact with, the inside surface 71 of the mould 70.

Figure 24:
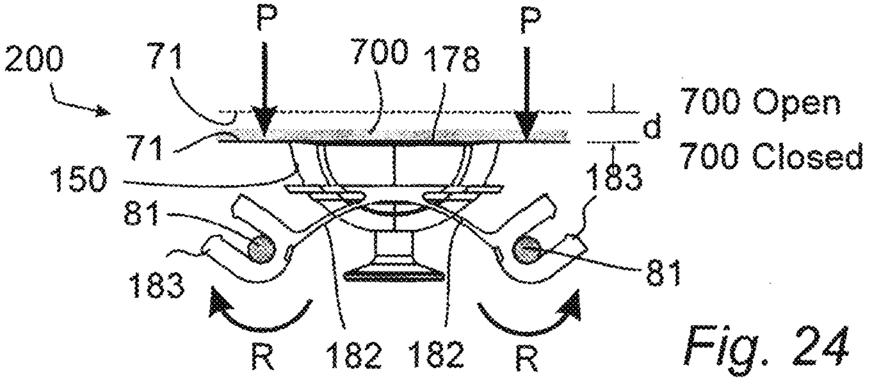
FIG. 24 is a similar view to FIG. 23, however with the mould closed to apply pressure to reduce the distance between the cage and the inside of the mould.

FIG. 24 shows the situation after the mould 70 has been closed. The surface 71 of the mould 70 pushes against the upper surface 178 of the recess former 150 and displaces it in the direction shown by the arrows P for a distance d. The non-rigid arms 182 of the frame 180 deflect in direction P and cause the clips or locating lugs 183 to rotate about and slide along the wires 81 in a direction shown by arrows R to accommodate the displacement caused by the flattening of the arcuate shape of the arms 182. The slot 184 in the lugs or clips 183 of arms 182 is dimensioned to provide a maximum deflection d to accommodate variations in the distance between wires 81 and the inside surface 71 of the mould 70 which may vary according to the design of the reinforced concrete element 1.

Figure 25A:
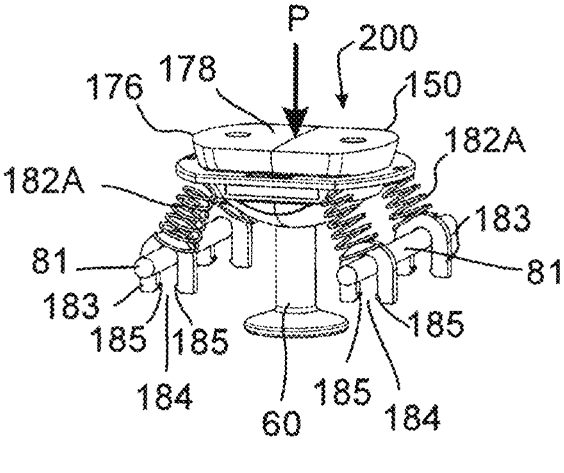
FIG. 25A is a side elevational view of a second embodiment of the present invention.
Figure 25B:
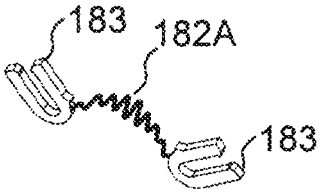
FIG. 25B is an isometric view from above of one spring part of a third embodiment of the present invention.
Figure 25C:
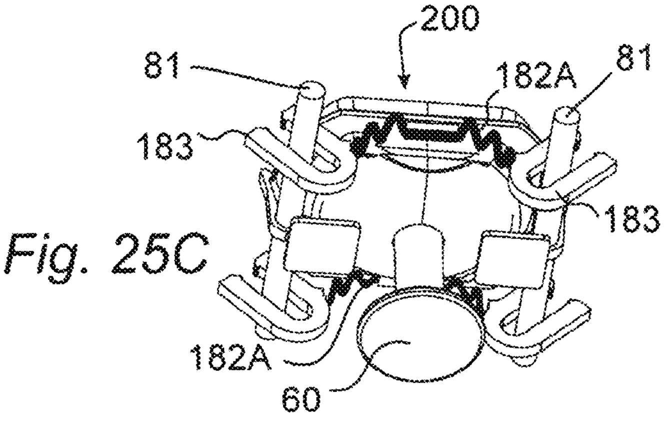
FIG. 25C is an isometric view from below of third embodiment of the present invention.

FIGS. 25A, 25B, and 25C show further embodiments of the assembly 200 where the non-rigid arms 182A incorporate helical springs, or as shown in FIGS. 25B and 25C are shaped from a wire into a flattened zig-zag shape which follows an arcuate path similar to the springs 182 in the preferred embodiment of FIG. 23. The arcuate path of the springs 182A permits deflection under pressure in the direction shown by arrows P as well as the lateral movement and rotation R shown in FIG. 24 described previously. In this embodiment the clips or lugs 183 have a slot or U-shaped bight 184 formed by a pair of legs and designed to tightly grip the wire 82 of the reinforcement cage 80, being retained by the restrictions 185 to prevent dislodgement.

Figure 25D:
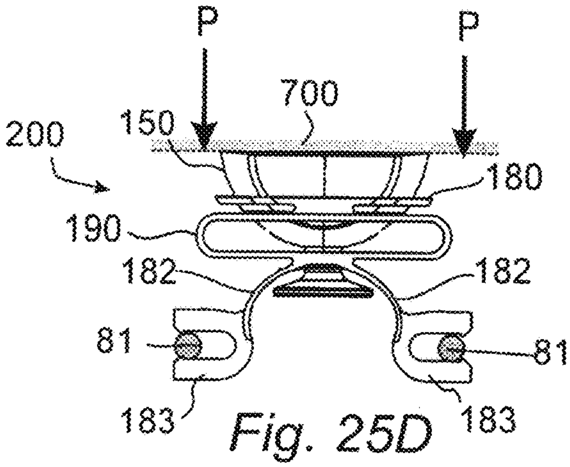
FIG. 25D is a side elevational view of a fourth embodiment of the present invention.
Figure 25E:
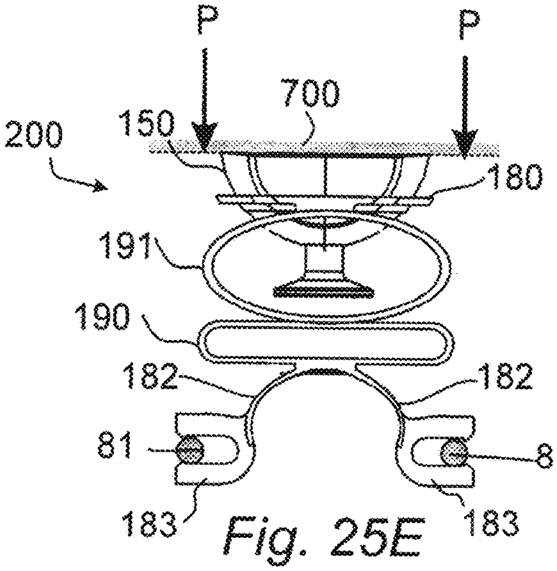
FIG. 25E is a side elevational view of a fifth embodiment of the present invention.

FIGS. 25D and 25E, show further embodiments of the assembly 200 which incorporate an additional spring element (or multiple elements) 190, 191 which may have an elongated loop, or elliptical or circular shape, and which are attached to and located between the frame 180 and the arms 182A. These additional spring and/or spacing elements 190, 191 provide additional distance Rd1, Rd2 as shown in FIGS. 16A, B as well as additional flexibility and freedom of movement in the direction indicated by the arrow P which acts in addition to the springs 182 in the preferred embodiment of FIG. 23. The total deflection in the direction P is therefore the sum of the flexures in this direction of the loop or oval shaped springs and the deflection resulting from the arcuate path of the clips 183 rotating about the wire 82 described previously. It is also possible that the spring elements 190, 191 can be attached directly to the clips 183, thereby omitting the arms 182. The number, shape and geometric disposition of these spring elements 190, 192 will vary according to the total displacement in direction P required to meet the requirements of the design.

FIGS. 26A-26G, show embodiments of the assembly 200 which do not require a spring element 182, 190, 191. The clips 183 are attached directly to the frame 180 and have an internal, longitudinal slot 184 with slot walls or legs 186 lying substantially parallel to the longitudinal axis of the anchor 60 and normal to the axis of the wires 81 to which they attach. The slot 184 has an open end 188 and a closed end 189. The open end 188 of the slot 184 incorporates restrictions 185 (or projecting feet on the legs) which are dimensioned to allow the clip 183 to be attached to the wire 81 but to prevent the clip 183, and therefore the frame 180, from disengagement and dislodgement after it has been clipped into position onto the wires 81.

The slot 184 is dimensioned so as to minimise lateral movement but allow sliding engagement with the wire 81 to permit relative movement between the recess assembly 200 and the wire 81 in a direction along the slot 184, between the open end 188 and the closed end 189 of the slot 184. An enlarged section 187 (or multiple enlarged sections, not shown) can be formed at locations along the walls 186 of the slot 184 to provide preferred indexed positions of the recess assembly 200 relative to the wire 81. In FIGS. 26A-26D the enlarged section 187 is located at the closed end of the slot 184 corresponding to the preferred initial location of this embodiment of the assembly 200 after attachment to the wires 81. It will be appreciated that these enlargements 187 are sized so as to only lightly restrain initial movement between the assembly 200 and the wires 81 but configured so as to allow the assembly 200 to be moved by the pressure of concrete flowing toward the assembly 200 during the casting process, in the direction of arrows CP.

When the recess assembly is located with the enlarged section 187 of the slot 184 co-incident with the wire 81, the assembly 200 is held in a stable position and provides clearance Rd between the top surface 178 of the assembly 200 and the mould 70. This clearance Rd enables the mould to be closed over the reinforcement cage 80 without contacting and dislodging the assembly 200. The length of the slot 184 between the restrictions 185 at the open end 188 and the closed end 189 is equal to or greater than the distance Rd required for the movement of the recess assembly 200.

Figure 26A:
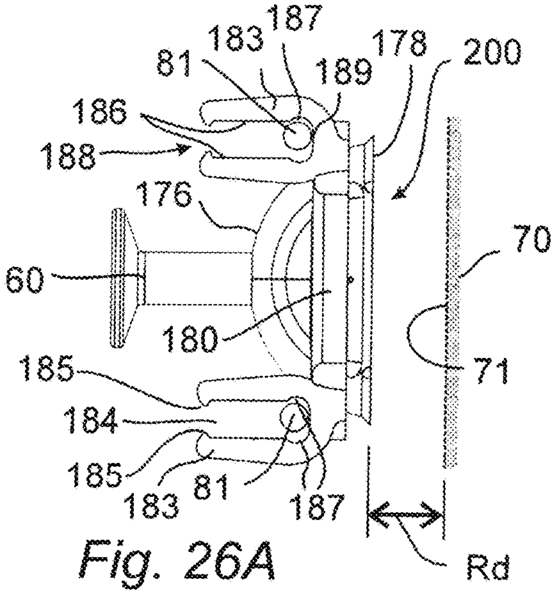
FIG. 26A and FIG. 26B are each a side elevational view of a sixth embodiment of the present invention in different positions with respect to the concrete mould wall.
Figure 26B:
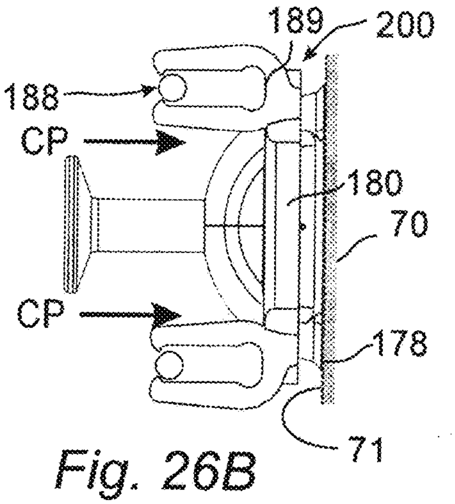

FIGS. 26A and 26B show the positions of an embodiment of the assembly 200 prior to and during concrete casting respectively, with respect to the inside surface 71 of the mould 70. This embodiment is configured such that the open end 188 of the slot 184 faces away from the surface 178 of the assembly 200. In FIG. 26A, and the corresponding isometric FIG. 26C the assembly 200 is shown clipped to the wires 81 located within the enlarged sections 187 of the slots 184 of the clips 183.

Figure 26C:
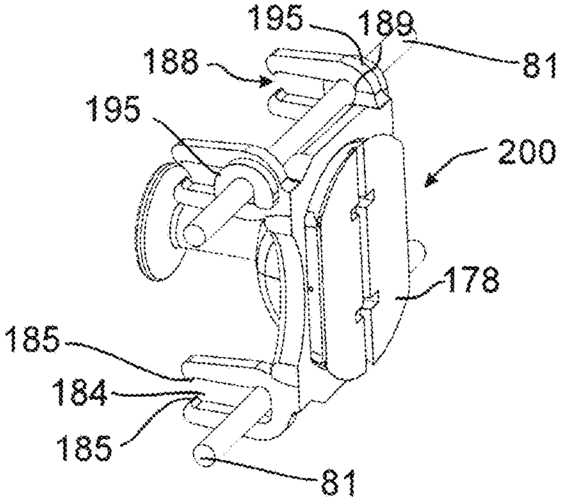
FIG. 26C and FIG. 26D are isometric views corresponding to the side elevations shown in FIG. 26A and FIG. 26B.

FIG. 26C also shows two (optional) lateral restraint clips or brake shoes 195 (not shown in FIG. 26A) clipped to the wire 81 adjacent the clips 183 of the assembly 200. These restraint clips 195 prevent the lateral movement of the assembly 200 in a direction along the wire axis so as to ensure that the assembly 200 is retained in a preferred, known position with respect to the reinforcement cage 80 of the concrete element 1.

Figure 26D:
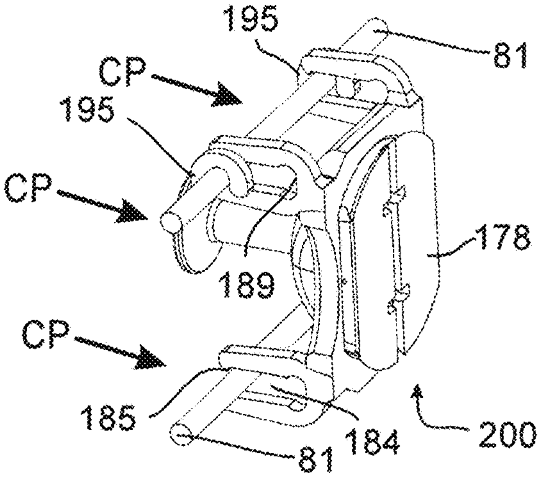

Turning now to FIGS. 26B and 26D which show this embodiment during the concrete casting process. The concrete (not shown) flows (in a direction shown by the arrows CP in FIGS. 26B and 26D) toward the mould 70 and applies pressure to the assembly 200 in direction CP, toward the mould 70. The slots 184 in the clips 183 allow the assembly 200 to be moved by the concrete pressure in the direction CP, until the gap Rd is closed and the surface 178 of the assembly 200 is brought to bear against the inside surface 71 of the mould 70. It will be appreciated that if clips 195 have been positioned as shown in FIGS. 26C and 26D, the assembly 200 is inhibited from moving in a direction along the wires 81 by the tangential forces which may arise if the concrete flows in a helical or quasi circular direction during the casting process, which can occur in the manufacture of concrete pipes and similar elements.

Figure 26E:
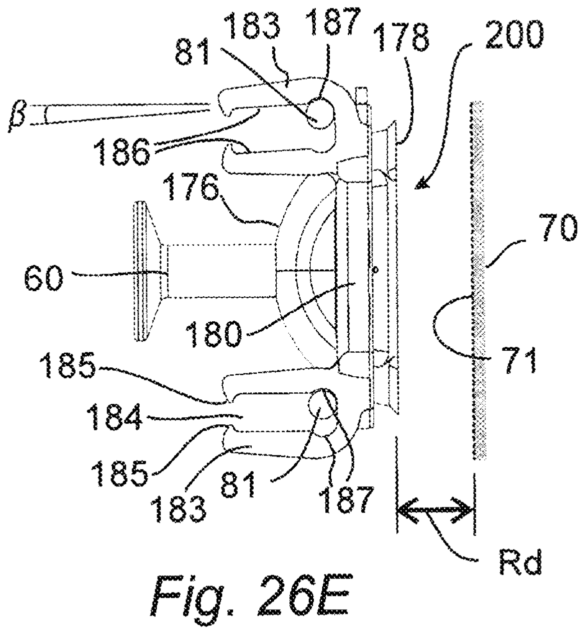
FIG. 26E is a side elevational view of a seventh embodiment of the present invention, in the same position as shown in FIG. 26A, FIG. 26F and FIG. 26G are each a side elevational view of an eighth embodiment of the present invention in different positions with respect to the concrete mould wall.

FIG. 26E shows a further embodiment of the assembly 200 in a similar position to the embodiment shown in FIG. 26A. The difference between this embodiment and those shown in FIGS. 26A-26D is that the internal slot walls 186 of this embodiment are rotated by a small angle $\beta$ from a direction normal to the plane of the surface 178 of the assembly 200 (essentially parallel to the axis of the anchor 60). This angle $\beta$ of the slot walls 186 provides an additional restraint on the initial movement between the wire 81 and the assembly 200 to ensure that the wire 81 is located and captured in the optimum position in the enlargement 187, to prevent its accidental dislodgement as a result of movement during closure of the mould 70 over the reinforcement cage 80. Experiment has indicated that the optimum angle $\beta$ lies between 0-5 degrees.

Figure 26F:
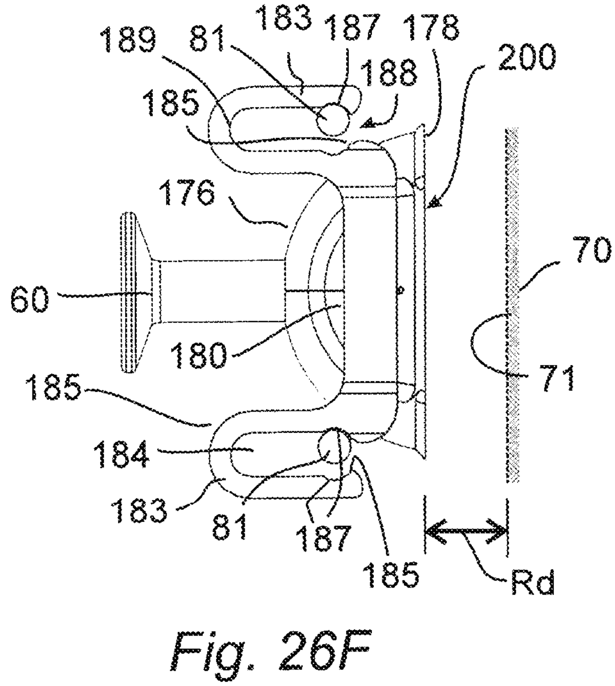
Figure 26G:
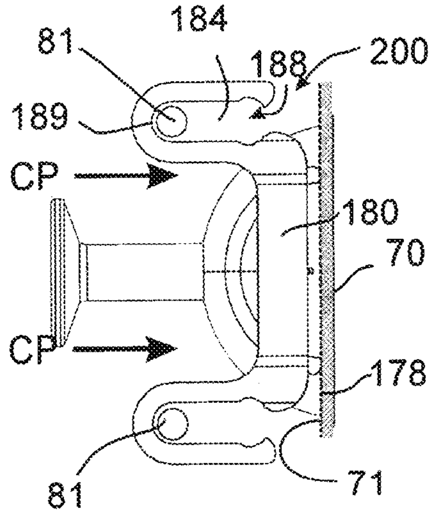

FIGS. 26F and 26G show another embodiment of the assembly 200, in a similar position to the embodiment shown in FIGS. 26A and 26B but configured such that the clips or U-shaped bights 183 of the assembly have been reversed in direction. In this configuration the open end 188 of the slot 184 faces toward the upper surface 178 of the recess assembly 200. It will be readily appreciated that this embodiment is introduced to the wire 81 from the inside of the reinforcement cage 80 rather than being clipped on from the outside. The location of the enlarged section 27 of the slot 184 is positioned at the open end 188 of the slot 184 adjacent the slot clips 195.

Figure 27:
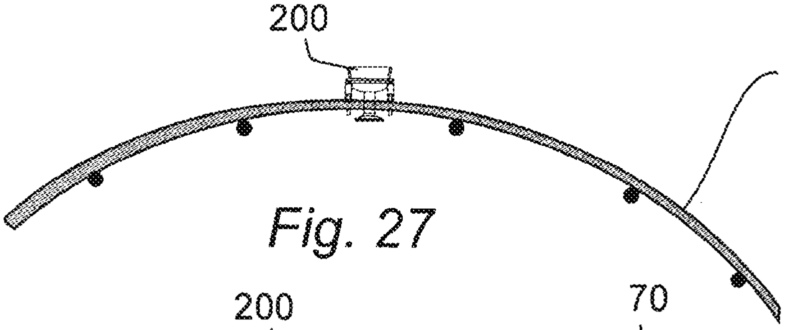
FIG. 27 shows a vertical cross-section of a reinforcement cage of a pipe with the embodiment shown in FIG. 17 attached to it prior to being enclosed in the casting mould.
Figure 28:
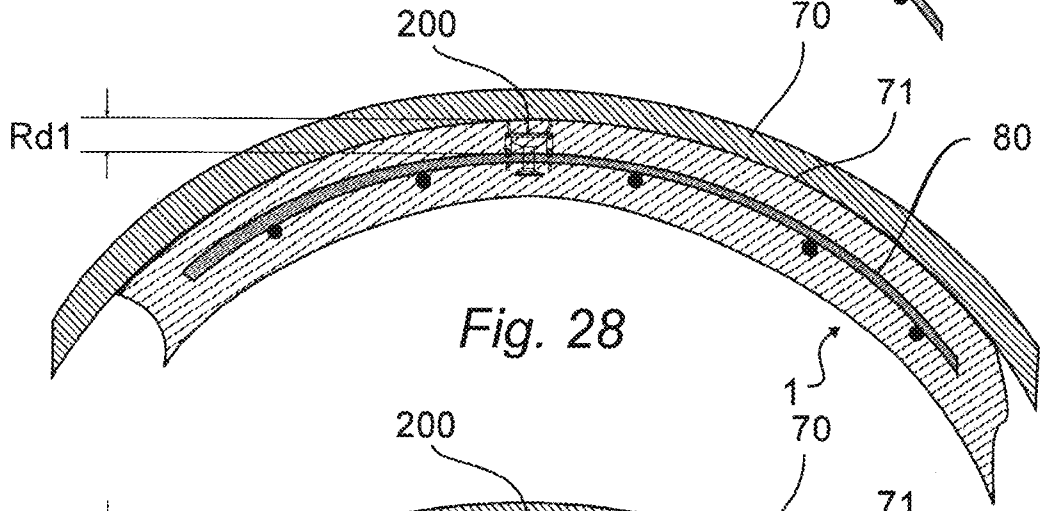
FIG. 28 is a view similar to FIG. 16A with the embodiment shown in FIG. 17 of the present invention attached to a reinforcement cage at a distance Rd1 between the inside of the mould and the reinforcement cage.
Figure 29:
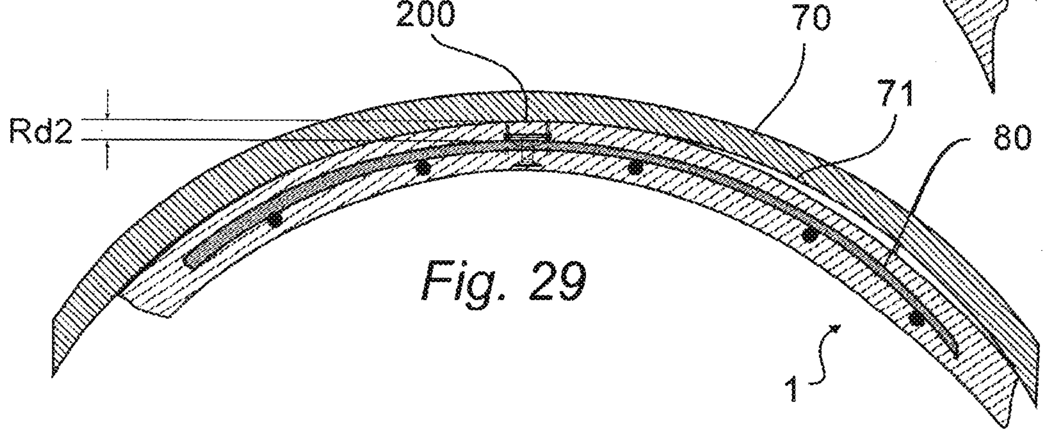
FIG. 29 is a view similar to FIG. 16B with the embodiment shown in FIG. 17 attached to a reinforcement cage at a lesser distance Rd2 between the inside of the mould and the reinforcement cage where the difference in distance between Rd1 and Rd2 is accommodated by displacement of the spring like arms of the present embodiment.

FIGS. 27 and 28 and 29 show the preferred embodiment 200 used for the production of concrete pipes with different reinforcement configurations which demonstrate the benefits of the preferred embodiment assembly 200.

The assembly 200 is fixed to the reinforcing cage 80 and positioned in the correct orientation with respect to the mould wall 71 without actually fixing the assembly 200 to the mould 70. This has the benefit that the reinforcing cage 80 with the attached anchor assembly or assemblies can be manufactured separately and introduced as a completed assembly into the mould 70 prior to casting and also that any relative movement between the mould 70 and cage 80 during the casting process does not result in additional forces transmitted to and resisted by the anchor 60 or assembly 200.

FIG. 27 shows the assembly 200 attached to the reinforcement cage 80 prior to introduction to the pipe mould 70.

FIGS. 28 and 29 show a partial transverse cross-section through the completed pipe 1 after pouring of the concrete but before removal of the pipe 1 for the mould 70. It can be seen that the assembly 200 accurately places the anchor 60 in the correct orientation adjacent to the mould wall at the correct design embedment within the pipe 1.

FIG. 28 shows the assembly 200 of the preferred embodiment attached to the reinforcement cage 80 at a distance Rd1 between the cage 80 and the inside surface 71 of the closed mould 70.

FIG. 29 shows the assembly 200 attached to the reinforcement cage 80 at a smaller distance Rd2 between the cage 80 and the inside surface 71 of the closed mould 70. The difference in the distances Rd1 and Rd2 is accommodated by compression of the spring arms 182 of the assembly previously indicated by FIG. 24.

It can be seen in FIGS. 28 & 29 that the correct distance between the mould wall 71 and reinforcing 80 is controlled by pressure between the upper surface 178 of the recess former 150 and the mould surface 71 which causes flexure of the arcuate arms 182 of the assembly 200. This precludes the need to manufacture individual recess former assemblies for every different variation in the distance Rd1, Rd2 between the reinforcement cage 80 and the mould wall 71 and is achieved without either external mechanical or manual intervention.

Further embodiments of the present invention are shown in FIGS. 30-36 which incorporate a spring retention and release mechanism which automatically releases the spring load either by direct pressure from a moving mould 70 or by pressure from other means, for example by concrete being forced against the release mechanism.

The embodiments shown in FIGS. 30-36 are particularly useful for the manufacture of vertically cast pipes, or in any manufacturing process where the recess former assembly 200 is attached to a reinforcement cage 80 over which is passed a mould 70. The benefit of these embodiments is that a spring release mechanism is actuated by the passage of the mould 70 over the cage 80, or by the pressure of concrete or vibration to ensure that the surface 178 is located in its design position and held by spring force adjacent to the surface 71 of the mould 70.

Figure 30A:
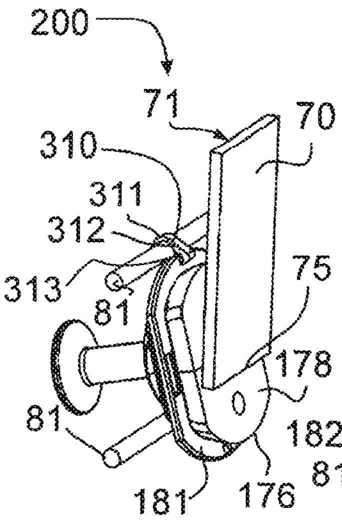
FIG. 30A is a frontal isometric view of a sixth embodiment of the present invention showing a mould part descending.
Figure 30B:
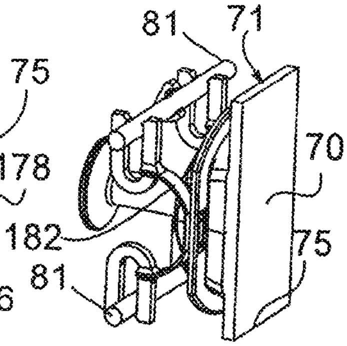
FIG. 30B is the same as FIG. 30A with the mould in position.

FIG. 30A shows an embodiment with a compressed spring and FIG. 30B shows an embodiment with spring released. The springs 182 have been omitted from the drawings so as to not over burden the drawings. In this embodiment of FIG. 30A, the frame 180 is depressed only on one side and attached to the reinforcement 81 by a retaining clip 310 which is shaped with a clip 311 on one end for attachment to the reinforcement 81 and shaped so as to be freely rotatable about the reinforcement 81 and a hook device 313 formed in a distal end which bears against the upper surface 181A of frame 181. This enables the frame 181 to be retained against, or at a close distance proximal to, the reinforcement 81. It will be realised that this embodiment results in the surface 178 of the recess former 150 lying at an attitude with an angle to the mould wall 71 of the mould 70. As the mould 70 is passed or moved vertically downwardly, it is prevented from contacting the clipped end of the depressed recess former 150 retained by the clip 310. However, as it is lowered further the lower edge 75 of the mould 70 strikes the surface 178 of the recess former 150. The resulting overturning moment combined with friction between the mould 70 and the surface 178 of the recess former, releases the clip 310 from the surface 181A of the frame 181. The springs 182 cause the recess former 150 to translate until the upper surface 178 of the recess former 150 bears against the interior surface 71 of the mould 70 as indicated in FIG. 30B.

The embodiments shown in FIGS. 31A, 31B, 31C and 31D incorporate a trigger release mechanism or latch with a trigger 320 contactable by the mould 70. The trigger 320 is formed with a clip 321 (obscured in FIG. 31B). One end of the clip 321 is for attachment to the reinforcement 81 and shaped so as to be freely rotatable about the reinforcement 81 and a notch or hook 322 for engagement with the frame 181.

The clip 330 also has a notch or hook for engagement with the frame 181.

Figure 31A:
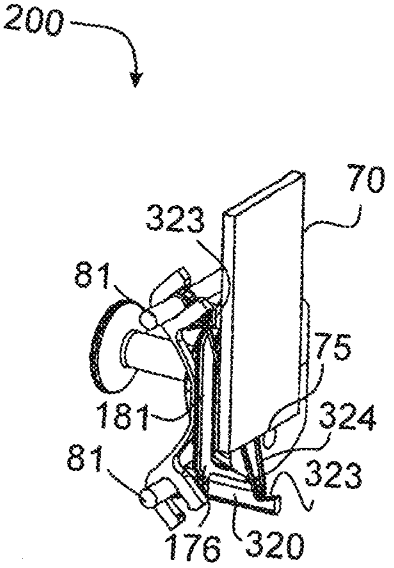
FIG. 31A is a frontal isometric view of a seventh embodiment of the present invention showing a mould part descending.

As seen in FIG. 31A, the descent of the mould 70 causes the lower edge 75 of the mould 70 to strike the trigger 320 which rotates clockwise about the reinforcement wire 81 causing the notch 322 to disengage from the frame 181. The reaction of the release of the spring force P following disengagement of the trigger 320 from the frame, or subsequent intense vibration during the concrete casting process, releases the second trigger 330 from the frame 181.

Figure 31B:
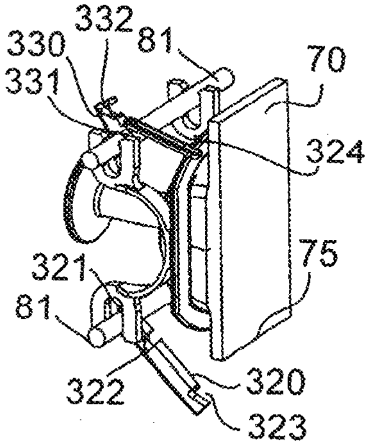
FIG. 31B is the same as FIG. 31A with the mould in position.
Figure 31C:
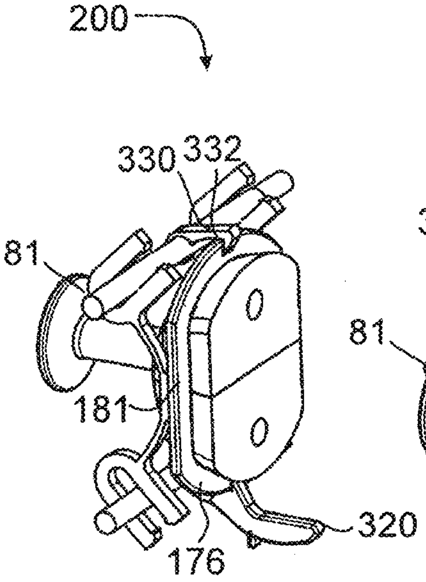
Figure 31D:
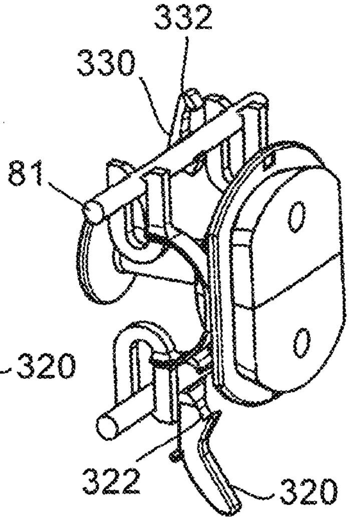

FIGS. 31A and 31B show an embodiment which incorporates a tension band 324 to provide positive disengagement of the second trigger 330 (FIG. 31B) from the frame 181. The trigger arm 320 has a second notch in a distal end for the attachment and retention of a tension band 324. The band 324 is attached to a similar but shorter trigger clip 330 attached to a second reinforcement wire 81 by a clip 331 (obscured) which is free to rotate about the reinforcement wire 81. The band 324 is configured by being wound around the second reinforcement 81 wire and attached to clip 330.

Tension in the band 324 causes the clip 330 to rotate anticlockwise, thereby disengaging the notch 332 from the frame 181.

When both the trigger 320 and the trigger clip 330 become disengaged, the spring force P from the springs 182 causes the frame 181 and recess former 150 to translate until the surface 178 of the recess former 150 bears against the interior surface 71 of the mould 70.

FIGS. 32A and 32B and FIGS. 33A and 33B show embodiments which incorporate trigger release mechanisms 420, 520 which are actuated by the pressure of the concrete resulting from the pipe manufacturing process (not shown) being pushed against a pressure plate 424, 524 of the of the release trigger 420, 520 which causes the triggers 420, 520 to rotate about the wires 81 onto which they are attached by clips 421, 521. The pressure of the concrete against the said surfaces 424, 524 causes the triggers 420, 520 to rotate and thereby disengage and release from the frame 181. The spring force of the springs 182 cause the frame 181 and recess former 150 to move adjacent the surface 71 of the mould 70.

FIG. 33A and FIG. 33B show an assembly 200 which is similar to the embodiment in FIGS. 32A and B but where the release direction of the triggers 520 is reversed from the triggers 420 shown in FIGS. 32A and 32B. In this embodiment, the pressure of concrete against the surfaces 524 of triggers 520 cause them to rotate in a direction toward the recess former 150 and disengage from the frame 181.

The further embodiments shown in embodiment shown in FIGS. 34A and 34B and FIGS. 35A and 35B function in a similar manner as the embodiment shown in FIGS. 31A and 31B in that they all incorporate a trigger release mechanism actuated by the contact by the forward edge 75 of the mould 70 being closed over the reinforcement cage 80.

Figure 34A:
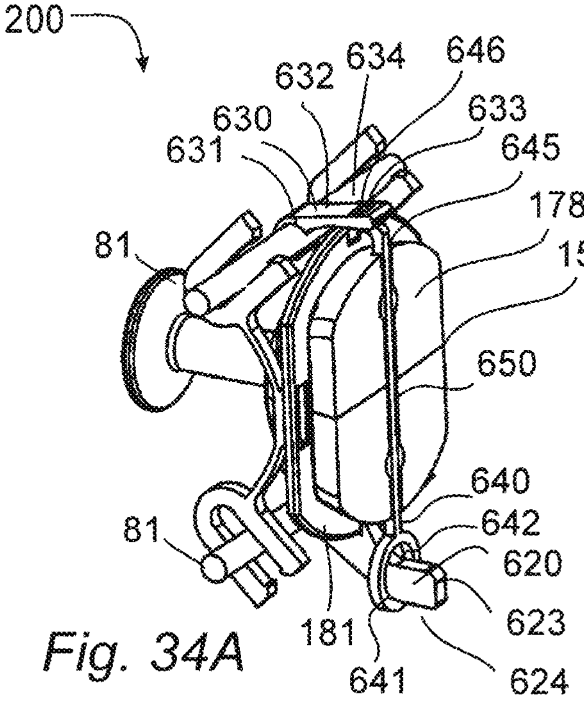
FIG. 34A is a frontal isometric view of a tenth embodiment of the present invention showing a mould part descending.

The embodiment shown in FIGS. 34A and B has a mechanical release mechanism with a trigger arm 620 shaped formed with a clip 621 (partially obscured) having one end for attachment to the reinforcement 81 and shaped so as to be freely rotatable about the reinforcement 81 and a notch or hook 622 for engagement with the frame 181 and a projecting arm 623 on a distal end 624 for engagement with the edge 75 of the mould 70 (not shown).

A second trigger clip 630 is attached to a second reinforcement wire 81 by a clip 631 (obscured) which is free to rotate about the reinforcement wire 81. The clip 630 has an arm 632 with an aperture 633 in a distal end 634 which lies below the level of the surface 178 of the recess former 150.

A drawbar 640 with a first end 641 with an attachment means 642 therein (shown as an aperture) passes over the attachment means 642 for connection to projecting arm 623 of the trigger 620. The drawbar 640 has a distal end shaped with a nose 646 which passes through, and is retained in, the aperture 633 of the second trigger clip 630.

The drawbar 640 passes through a channel formed in the surface 178 of the recess 150 such that it does not project from the surface 178. That is, the drawbar 640 is not proud of the surface 178.

Figure 34B:
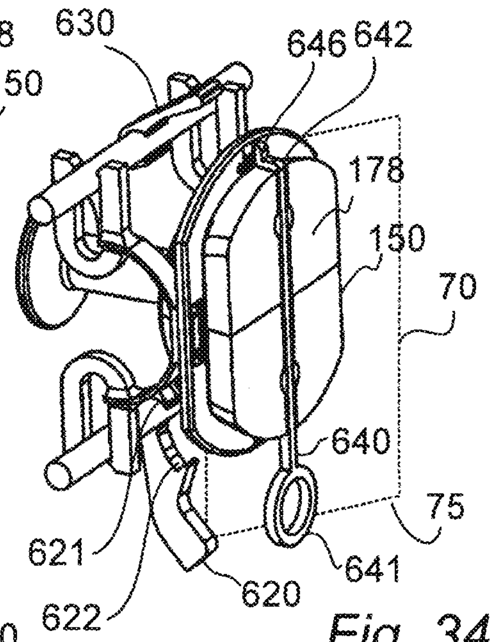
FIG. 34B is the same as FIG. 34A with the mould in position.

As shown in FIG. 34B, contact between the end 75 of the mould 70 causes the trigger 620 to rotate so that the notch 622 disengages from the frame 181. As the trigger 620 moves away from the frame 181 it pulls the drawbar 640 which causes the nose 646 to withdraw from the aperture 633, thereby releasing the second trigger clip 630.

The spring force in the springs 182 causes the frame 181 and recess former 150 to move until the surface 178 of the recess former lies adjacent the surface 71 of the mould 70.

The embodiment shown in FIGS. 35A, 35B, 35C, 35D has a mechanical release mechanism similar to the embodiment shown in FIGS. 34A and 34B. However, there is a different configuration of the trigger arm 620 and the drawbar 640.

The trigger arm 620 is formed with a clip 621 (partially obscured) one end for attachment to the reinforcement 81 and shaped so as to be freely rotatable about the reinforcement 81 and a projecting arm 623 on a distal end 624 for engagement with the edge 75 of the mould 70 (not shown).

Figure 35A:
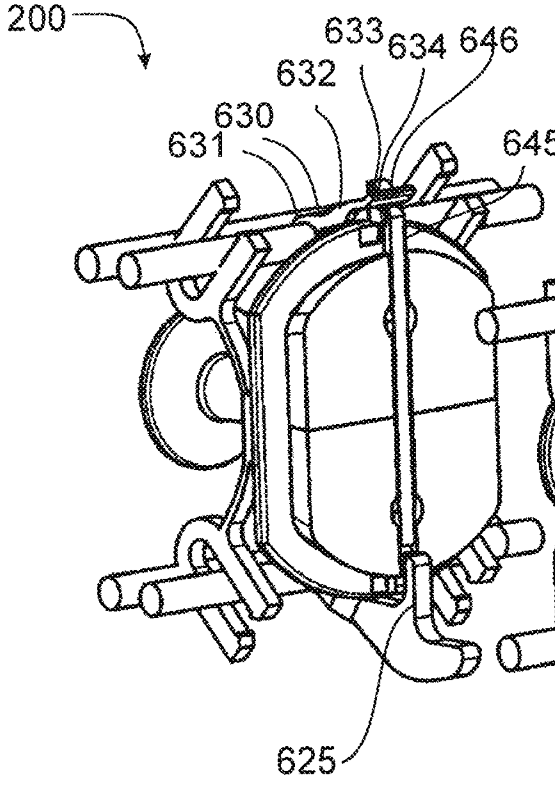
FIG. 35A is a frontal isometric view of an eleventh embodiment of the present invention prior to the mould part (not shown) descending toward the invention.
Figure 35B:
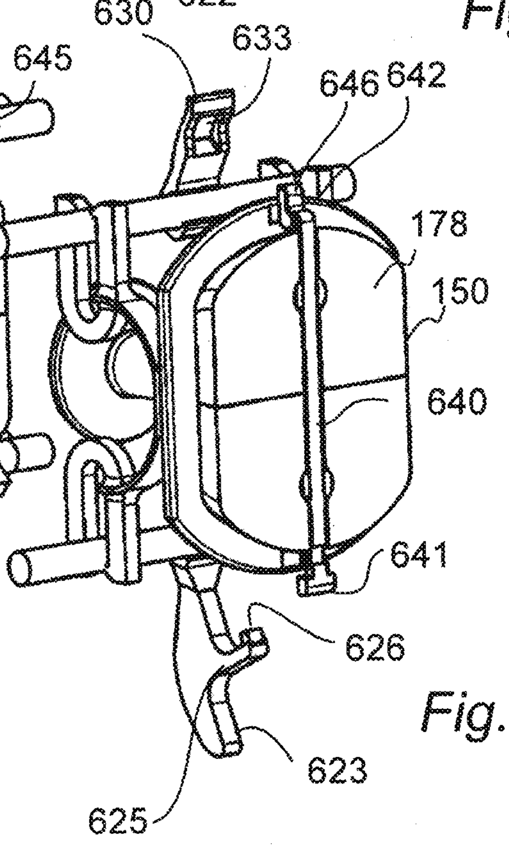
FIG. 35B is the same as FIG. 35A when the mould part (not shown) is in position.
Figure 35C:
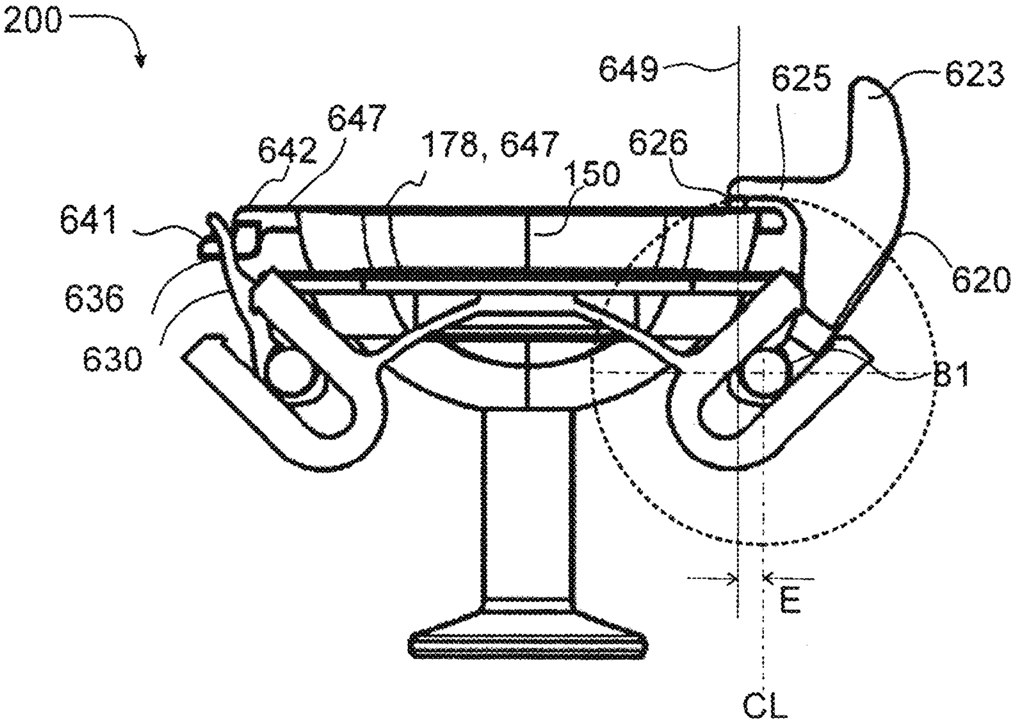
FIG. 35C is a side elevation of the embodiment shown in FIG. 35A.

The trigger 620 has a lateral arm 625 projecting from the arm 623 which has a nib 626 located at the distance E indicated by the arrows shown in FIG. 35C from the centre line CL (shown as a broken line) of the wire 81 of the reinforcement cage 80.

A second trigger clip 630 is attached to a second reinforcement wire 81 by a clip 631 (obscured) which is free to rotate about the reinforcement wire 81. The clip 630 has an arm 632 with an aperture 633 in a distal end 634 which lies below the level of the surface 178 of the recess former 150.

A drawbar 640 with a top surface 647 has a notch 648 in the top surface 647 located at a distance from a first end 641. The notch 648 provides a means for engagement and retention of the nib 626 of the trigger 620.

The drawbar 640 has a distal end 645 shaped with a nose 646 which passes through, and is retained by, the aperture 633 of the second trigger clip 630.

The drawbar 640 passes through a channel 650 formed in the surface 178 of the recess 150 such that the upper surface 647 of the drawbar 640 lies adjacent the surface 178 of the recess former 150.

FIG. 35C shows the recess assembly 200 compressed as in FIG. 24 after attachment to the reinforcement cage 80.

The nose 646 of the drawbar 640 is engaged in the aperture 636 of the trigger 630. The position of the notch 648 in the drawbar 640 aligns with a line 649 which passes through the nib 626 of the trigger 620 at a distance E from the centre line CL of the wire 81. The spring force P referred to in FIG. 24 is restrained by the drawbar 640 which is fixed at the said distal end 645 of the drawbar 640 by the nib 646 of the drawbar 640 in the aperture 636 of the trigger 630. Also at the said first end of the drawbar 640, the nib 626 of the trigger 620 is engaged in the notch 648 of the drawbar 640. The position of the line 649 is preferably located such that it lies within the surface 178 of the recess 150.

It will be understood from the foregoing explanations that when the end 75 of the mould 70 contacts the trigger arm 620 it causes it to rotate about the wire 81. This rotation is such that the nib 626 moves in an arcuate path around the centre CL of the wire 81, which is indicated as a circle of a broken line in FIG. 35C. The rotation of the trigger 620 in combination with the eccentricity of distance E from the centre of the wire 81 causes the nib 626 to translate both horizontally and vertically up prior to reaching the centreline CL of the wire 81. The horizontal movement of the nib 626 engaged in the notch 648 of the drawbar 640, causes the drawbar to be translated horizontally toward the trigger 620. This releases the nib 646 of the drawbar 640 from the aperture 636 of the trigger 630.

The distance E is selected to ensure that when the rotation of the trigger arm 620 causes the nib 626 to align with the centreline CL of the wire 81, the nib 626 has moved in a vertical direction sufficient to allow complete disengagement between the nib 626 of the trigger arm 620 and the notch 648 of the drawbar 640. Also that the distal end 645 of the drawbar 640 is restrained from further movement by contact with the recess former 150 and retained within the slot 650 in the upper surface 178 of the recess former 150. Disengagement of the trigger arm 620 from the drawbar 640 permits further unrestrained rotation of the trigger arm and ensures that the drawbar 640 is captured within the slot 650 of the recess former 150.

Figure 35D:
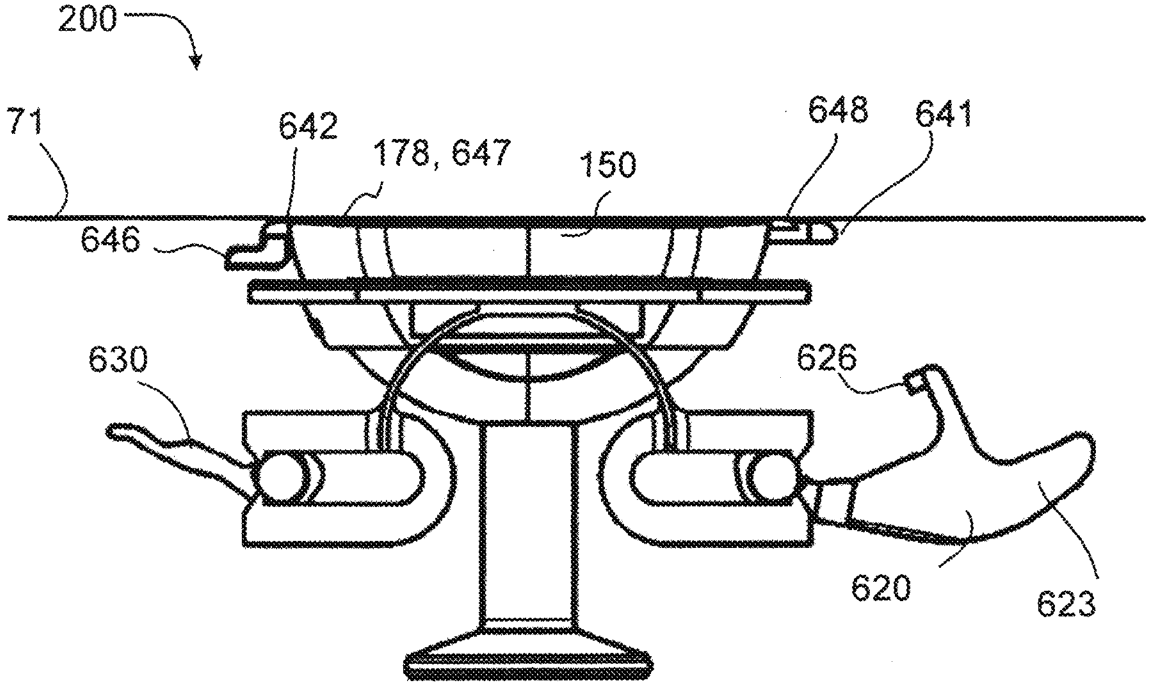
FIG. 35D is a side elevation of the embodiment shown in FIG. 35B.

FIGS. 35B and 35D show the assembly 200 after release of the spring pressure P whereby the upper surface 178 of the recess former 150, as well as the upper surface 647 of the drawbar 640 lie adjacent to the wall 71 of the mould 70. The drawbar 640 is captured within the slot 650 of the recess. The triggers 630 and 620 are free to rotate but remain fixed on the wires 81 of the reinforcement cage 80. This embodiment ensures that the drawbar 640 and the triggers 620, 630 remain attached to the assembly 200 and wires 81 of the cage 80. This is important to ensure that loose parts of the assembly 200 do not become lodged in either the manufacturing equipment, or within the wall 91 of the pipe 1, at undesirable locations.

Figures 36A, 36B:
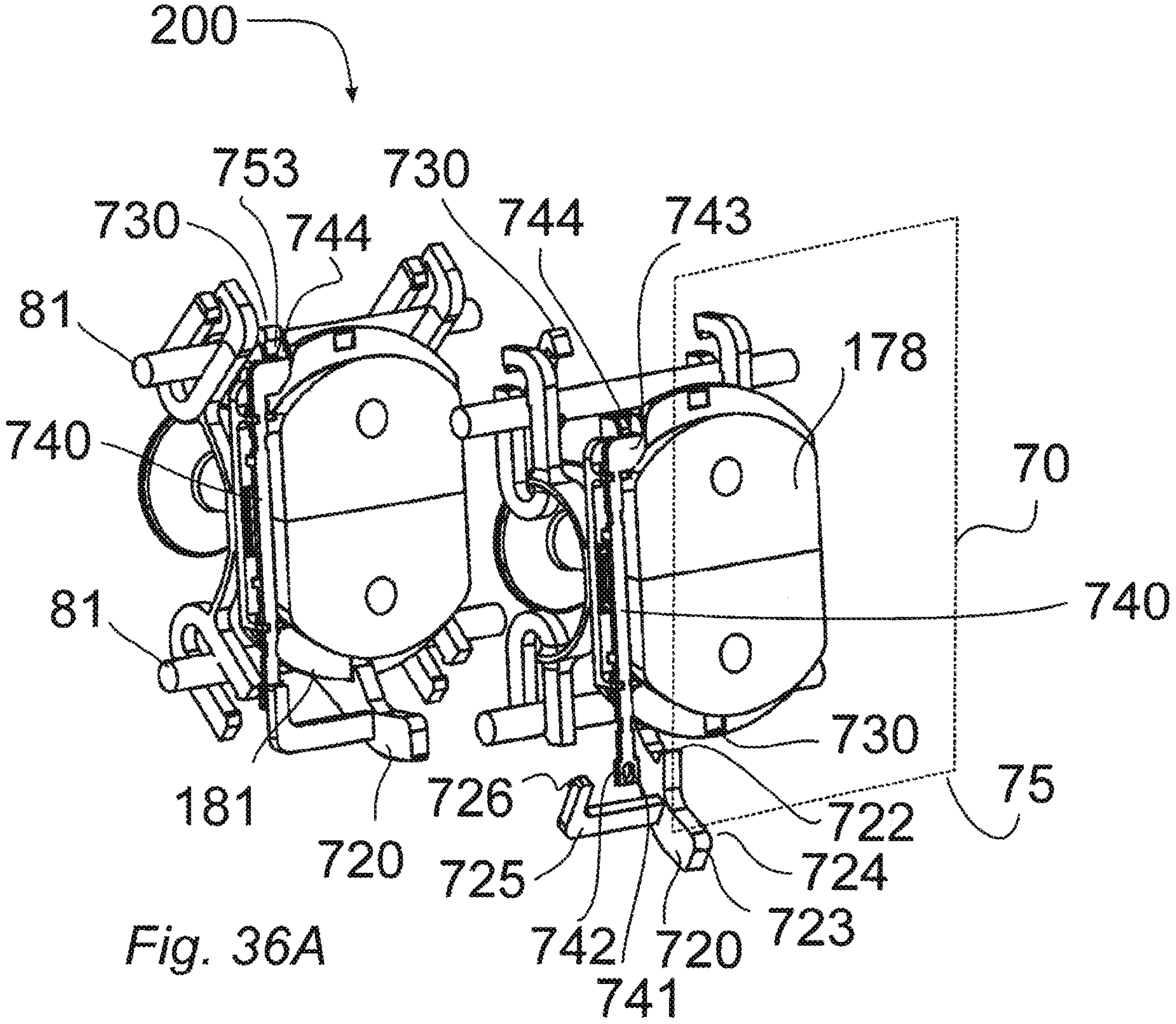
FIG. 36A is a frontal isometric view of a twelfth embodiment of the present invention showing a mould part descending.
FIG. 36B is the same as FIG. 36A with the mould in position.

FIGS. 36A and 36B show an embodiment with a trigger arm 720 shaped to form a clip 721 (partially obscured) on one end for attachment to the reinforcement 81 and shaped so as to be freely rotatable about the reinforcement 81. The arm 720 has a notch or hook 722 which bears against a slightly depressed or roughened engagement surface 730 of the frame 181 and a projecting arm 723 on a distal end 724 for engagement with the edge 75 of the mould 70 (shown in FIG. 36B).

The trigger clip 720 has a lateral arm 725 into which is formed a projecting engagement pin 726 which connects to a drawbar 740 by passing through an aperture 741 formed in a first end 742 of the drawbar 740.

The drawbar 740 has a distal end 743 into which is formed a seat 744.

The distal end 743 is configured to bear upon the surface 176 of the frame 181 and is moveable a distance longitudinally without being obstructed by the outside of the frame 181.

A second trigger clip 730 is attached to a second reinforcement wire 81 by a clip 731 (obscured) which is free to rotate about the reinforcement wire 81. The clip 730 has an arm 732 with a notch 733 in a distal end 734 for engagement with the seat 744 of the pushrod or drawbar 740.

As shown in FIG. 36B, contact between the end 75 of the mould 70 causes the trigger 720 to rotate so that the notch 722 disengages from the frame 181. As the trigger 720 moves away from the frame 181, it pulls the drawbar 740 which causes the seat 744 in the distal end 743 of the drawbar 740 to withdraw from the aperture notch 753 of the second trigger clip 730. This thereby releases the second trigger clip 730.

The spring force in the springs 182 causes the frame 181 and recess former 150 move until the surface 178 of the recess former lies adjacent the surface 71 of the mould 70.

The foregoing describes only some embodiments of the present invention and modifications, obvious to those skilled in the concrete arts, can be made thereto without departing from the scope of the present invention. For example, the attachment means for the two recess parts 151A and 151B (FIG. 18) can be achieved by using magnetic implants.

Similarly, the recess former 150 can take the form of the body with a cavity to contain the attachment end 61 of the anchor 60. The anchor 60 is retained within the recess 150 by any or all of a resilient sealing element, shaped retention collets, or magnetic means which are slidably engageable within the cavity of the recess body. These retention arrangements are configured so as to enable the body to be removed by pulling it from the attachment end 61 of the anchor 60 after the concrete has cured.

Furthermore, the recess former 150 need not have a spherical form. Instead, it can be shaped with tapered portions which can be removed from the hardened concrete. Similarly, the recess former can take the form of a number of separable bodies each of tapered shape which, when fitted together, enclose the attachment end 61 of the anchor. These tapered bodies are removable by withdrawal from the hardened concrete.

Similarly, the recess former 150 can be formed in one body which is hinged to enable it to be closed about the attachment end 61 of the anchor 60. Alternatively, the anchor 60 can be of a planar section and the attachment means for the lifting device effected by an aperture in the planar body. Similarly, the anchor 60 can be formed with an internal, or external, thread or other interlocking form for attachment of a compatible interlocking lifting device. Such an arrangement can include an internal thread to accept a bolt.

Furthermore, although the preferred embodiments relate to the manufacture of pipes, the description is equally applicable to other cast concrete elements where there is a variation in the distance between the reinforcement to which the recess former assembly is attached, and the concrete surface.

Other embodiments (not shown) of the assembly 200 with other means for attachment of the recess former 150 to the frame 180 and/or other means for effecting the spring elements 182, 182A, 190, 191 or other clipping arrangements 183 adapted to attach various configurations of the reinforcement cage 80 and its longitudinal reinforcing wires 82 and the radial wires 81, are possible.

It will be apparent that the general arrangement takes the form of a recess former assembly (200) for creating a recess surrounding a cast in situ lifting element (60) in a cast concrete pipe (1) having a cast outer surface. The assembly has a frame (180) having locating lugs (183) engageable with components (81) of a reinforcing cage (80) to be positioned within the mould (70). The engagement of the lugs with the reinforcing components locates the frame in a rest position spaced from the mould. A removable recess former (150) is releasably retained in the frame. A lifting element (60) is retained within the recess former and has an anchor portion (64) extending therefrom. A non-rigid interconnection (182, 182A, 190, 191) between the lugs and the frame to bias the frame and recess former to be urged towards the mould into an operative casting position in which at least a portion of the recess former substantially abuts the mould.

Preferably the non-rigid interconnection between the lugs and the frame takes the form of at least one flexible arm (182). Alternatively, the non-rigid interconnection between the lugs and the frame can take the form of a spring (182A). Preferably such a spring or the arm is moulded from a plastics material being the material from which the lugs on the frame are also moulded.

Preferably the locating lugs take the form of U-shaped bights (for example slot 184) formed by a pair of legs (183 having feet 185 which restrict the entrance to the slot 184). The bights or slots 184 can face either towards or away from the mould (70). In addition, the frame preferably additionally includes brake shoes (such as lateral restraint clips 195) which prevent the assembly sliding along the cage component (81). The reinforcing components of the cage preferably have a longitudinal axis and the bights (184) are located substantially normal to the longitudinal axis.

The movement from the rest position to the casting position is preferably assisted by the pressure of the flowable concrete being forced into and through the cage (80). Preferably the frame (180) is retained in its rest position by a releasable latch (for example the trigger 320 or 620). This releasable latch is released or triggered by movement of the mould (70) relative to the cage (80).

The general arrangement also uses a method of holding a recess former for creating a recess surrounding a cast in situ lifting element in a cast concrete element having a cast outer surface. This method uses the steps of:

- positioning a frame having locating lugs relative to a reinforcing cage within the mould by engaging the locating lugs with components of the reinforcing cage to thereby locate the frame in a rest position spaced from the mould,
- releasably retaining a removable recess former in the frame,
- retaining a lifting element within the recess former, this lifting element having an anchor portion extending from the recess former, and
- providing a non-rigid interconnection between the lugs and the frame to bias the frame and recess former to be urged towards the mould in an operative casting position in which at least a portion of the recess former substantially abuts the mould.

The term "comprising" (and its grammatical variations) as used herein is used in the inclusive sense of "including" or "having" and not in the exclusive sense of "consisting only of".

The invention claimed is:

1. A recess former assembly for creating a recess surrounding a cast in situ lifting element in a cast concrete element having a cast outer surface, said assembly comprising:

- a frame having locating lugs engageable with components of a reinforcing cage to be positioned within the mould in which said concrete element is to be cast, engagement of said locating lugs with said reinforcing components locating said frame in a rest position spaced from said mould,
- a removable recess former releasably retained in said frame,
- a lifting element retained within said recess former and having an anchor portion extending from said recess former, and
- a non-rigid interconnection between said lugs and said frame permitting said frame and recess former to be urged towards said mould into an operative casting position in which at least a portion of said recess former substantially abuts said mould, and wherein the frame is movable relative to the lugs and out of the rest position by the pressure of flowable concrete being positioned over the cage.

2. The recess former assembly as claimed in claim 1 wherein said non-rigid interconnection between said lugs and said frame comprises at least one flexible arm.

3. The recess former assembly as claimed in claim 2 wherein said non-rigid interconnection between said lugs and said frame comprises a resilient interconnection.

4. The recess former assembly as claimed in claim 2 wherein said locating lugs comprise U-shaped bights formed by a pair of legs.

5. The recess former assembly as claimed in claim 1 wherein said non-rigid interconnection between said lugs and said frame comprises a resilient interconnection.

6. The recess former assembly as claimed in claim 5 wherein said resilient interconnection comprises at least one spring.

7. The recess former assembly as claimed in claim 6 wherein the, or each, said spring is moulded from a plastics material from which the lugs and frame are also moulded.

8. The recess former assembly as claimed in claim 6 wherein said locating lugs comprise U-shaped bights formed by a pair of legs.

9. The recess former assembly as claimed in claim 5 wherein said locating lugs comprise U-shaped bights formed by a pair of legs.

10. The recess former assembly as claimed in claim 1 wherein said locating lugs comprise U-shaped bights formed by a pair of legs.

11. The recess former as claimed in claim 10 wherein said U-shaped bights face towards that portion of said mould against which said recess former abuts.

12. The recess former as claimed in claim 10 wherein said U-shaped bights face away from that portion of said mould against which said recess former abuts.

13. The recess former as claimed in claim 10 wherein said reinforcing components have a longitudinal axis and said bights are located substantially normal to said longitudinal axis.

14. The recess former as claimed in claim 10 wherein said legs each include a projecting foot which forms a restricted entrance to said U-shaped bights.

15. The recess former as claimed in claim 1 and including a brake shoe able to be engaged with said cage component to prevent said assembly sliding along said cage component.

16. The recess former as claimed in claim 15 wherein said brake shoe is snap engageable with said cage component.

17. The recess former as claimed in claim 1 wherein said frame is retained in said rest position by a releasable latch.

18. The recess former as claimed in claim 17 wherein said latch is releasable by movement of said mould relative to said cage.

* * * * *